US008883043B2

(12) United States Patent
Freund et al.

(10) Patent No.: US 8,883,043 B2
(45) Date of Patent: Nov. 11, 2014

(54) SELF-DOPED POLYANILINE NANOPARTICLE DISPERSIONS BASED ON BORONIC ACID-PHOSPHATE COMPLEXATION

(75) Inventors: Michael S. Freund, Winnipeg (CA); Bhavana A. Deore, Ottawa (CA)

(73) Assignee: University of Manitoba, Winnipeg, Manitoba (CA)

( * ) Notice: Subject to any disclaimer, the term of this patent is extended or adjusted under 35 U.S.C. 154(b) by 780 days.

(21) Appl. No.: 13/131,052

(22) PCT Filed: Nov. 25, 2009

(86) PCT No.: PCT/CA2009/001679
§ 371 (c)(1),
(2), (4) Date: Sep. 8, 2011

(87) PCT Pub. No.: WO2010/060195
PCT Pub. Date: Jun. 3, 2010

(65) Prior Publication Data
US 2011/0315932 A1    Dec. 29, 2011

Related U.S. Application Data

(60) Provisional application No. 61/117,841, filed on Nov. 25, 2008.

(51) Int. Cl.
*H01B 1/00* (2006.01)
*B32B 5/16* (2006.01)
(Continued)

(52) U.S. Cl.
CPC .............. *C09D 5/08* (2013.01); *C08G 73/0266* (2013.01); *C09D 5/24* (2013.01);
(Continued)

(58) Field of Classification Search
None
See application file for complete search history.

(56) References Cited

U.S. PATENT DOCUMENTS 5,281,363 A * 1/1994 Shacklette et al. ............ 252/500
6,003,362 A   12/1999 Dieckmann et al.
(Continued)

FOREIGN PATENT DOCUMENTS

EP    2272894       1/2011
JP    2009523865    6/2009
(Continued)

OTHER PUBLICATIONS

Madrid, F. J. et al., Insects in Stored Cereals, and Their Association with Farming Practices in Southern Manitoba. The Canadian Entomologist, 1990, 122, 515-523.

(Continued)

*Primary Examiner* — Harold Pyon
*Assistant Examiner* — Jaison Thomas

(57) ABSTRACT

Poly(anilineboronic acid)/phosphate nanoparticle dispersions are produced in high yields using the reactivity of the boronic acid moiety with phosphate in the presence of fluoride. The poly(anilineboronic acid)/phosphate dispersions have been characterized using spectroscopic, microscopic and electrochemical techniques. According to $^{11}$B NMR studies, the formation of anionic tetrahedral boronate group in phosphoric acid in the presence of fluoride forms the basis of self-doped, stabilized PABA nanoparticle dispersion. Transmission electron microscope images show that 25-50 nm diameter PABA nanoparticles are formed under these conditions. UV-vis, FT-IR-ATR spectroscopic and cyclic voltammetric results confirm the formation of the conducting form of PABA. Films produced from these particles exhibit enhanced redox stability and potential dependant conductivity under neutral and basic pH conditions due to the formation of a boron-phosphate complex containing fluoride, which results in a self-doped form of the polymer.

12 Claims, 9 Drawing Sheets

(51) Int. Cl.

| | |
|---|---|
| *C08L 81/00* | (2006.01) |
| *C08L 85/00* | (2006.01) |
| *C08G 79/08* | (2006.01) |
| *C09D 5/08* | (2006.01) |
| *C08G 73/02* | (2006.01) |
| *C09D 5/24* | (2006.01) |
| *C09D 179/02* | (2006.01) |

(52) U.S. Cl.
CPC ........... *C09D 179/02* (2013.01); *Y10S 977/773* (2013.01); *Y10S 977/832* (2013.01); *Y10S 977/902* (2013.01)
USPC ........... 252/500; 428/402; 524/609; 524/610; 528/7; 977/773; 977/832; 977/902

(56) References Cited

U.S. PATENT DOCUMENTS

| | | | |
|---|---|---|---|
| 6,797,152 | B2 | 9/2004 | Freund et al. |
| 6,846,855 | B2 | 1/2005 | Campbell et al. |
| 7,144,553 | B2 | 12/2006 | Lewis et al. |
| 8,298,443 | B2 * | 10/2012 | Freund et al. ................. 252/500 |
| 8,454,819 | B2 * | 6/2013 | Neethirajan et al. .......... 205/775 |
| 2002/0142477 | A1 | 10/2002 | Lewis et al. |
| 2002/0197390 | A1 | 12/2002 | Lewis et al. |
| 2007/0009736 | A1 | 1/2007 | Chuang et al. |
| 2007/0093644 | A1 | 4/2007 | Deore et al. |
| 2008/0038448 | A1 | 2/2008 | Kholodenko et al. |
| 2009/0214762 | A1 | 8/2009 | Lewis et al. |
| 2009/0299031 | A1 | 12/2009 | Freund et al. |
| 2010/0270507 | A1 | 10/2010 | Freund et al. |
| 2011/0056846 | A1 | 3/2011 | Neethirajan et al. |

FOREIGN PATENT DOCUMENTS

| | | |
|---|---|---|
| WO | 02088044 | 11/2002 |
| WO | 2005054338 | 6/2005 |
| WO | WO 2007082383 A1 * | 7/2007 |

OTHER PUBLICATIONS

Magan, N. et al., Volatiles as an Indicator of Fungal Activity and Differentiation Between Species, and The Potential Use of Electronic Nose Technology for Early Detection of Grain Spoilage. Journal of Stored Products Research, 2000, 36, 319-340.
Mahmoudi, B. et al., Photoluminescence Response of Gas Sensor Based on CHx/Porous Silicon-Effect of Annealing Treatment. Materials Science and Engineering B, 2007, 138, 293-297.
Maier, D. E. et al., Monitoring carbon Dioxide Levels for Early Detection of Spoilage and Pests in Stored Grain. Proceedings of the 9th International Working Conference on Stored Product Protection, Oct. 15-18, 2006, 1174-1181.
Mandayo, G. G. et al., BaTiO3—CuO Sputtered Thin Film for Carbon Dioxide Detection. Sensors and Actuators B: Chemical, 2006, 118, 305-310.
Moseley, P. T., Solid State Gas Sensors. Measurement Science and Technology, 1997, 8, 223-237.
Müller, B. et al., Fluorescence Optical Sensor for Low Concentrations of Dissolved Carbon Dioxide. The Analyst, 1996, 121, 339-343.
Mulrooney, J. et al., Detection of Carbon Dioxide Emissions From a Diesel Engine Using a Mid-Infrared Optical Fibre Based Sensor. Sensors and Actuators A, 2006, 136, 104-110.
Nakamura, N. et al., An Optical Sensor for CO2 Using Thymol Blue and Europium(II) Complex Composite Film. Sensors and Actuators B: Chemical, 2003, 92, 98-101.
Neethirajan, S., Carbon Dioxide (CO2) Sensor for Agri-Food Industry—A Review. Food Bioprocess Technol. Thesis Submitted to the University of Manitoba, Aug. 2009. vol. 2, 115-121.
Ogura, K. et al., A ?CO?2 Sensing Composite Film Consisting of Base-Type Polyaniline and Poly(vinyl alcohol). Electrochemical and Solid-State Letters, 1999, 2, 478-480.

Oho, T. et al., J. A CO2 Sensor Operating Under High Humidity. Electroanalytical Chemistry, 2002, 522, 173-178.
Pasierb, P. et al., Long-Term Stability of Potentiometric CO2 Sensors Based on Nasicon As a Solid Electrolyte. Sensors and Actuators B: Chemical, 2004, 101, 47-56.
Prokes, J. et al., Polyaniline Prepared in The Presence of Various Acids 2. Thermal Stability of Conductivity. Polymer Degradation and Stability, 2004, 86, 187-195.
Segawa, H. et al., Sensitivity of Fiber-Optic Carbon Dioxide Sensors Utilizing Indicatoe Dye. Sensors and Actuators B: Chemical, 2003, 94, 276-281.
Shimizu, Y. et al., Solid Electrlyte CO2 Sensor Using NASICON and Perovskite-Type Oxide Electrode. Sensors and Actuators B: Chemical, 2000, 64, 102-106.
Sipior, J. et al., Phase Fluorometric Optical Carbon Dioxide Gas Sensor for fermentation Off-Gas Monitoring. Biotechnology Progress, 1996, 12, 266-271.
Smith, S. et al., Nanotechnology Enabled Sensors: Possibilities, Realities, and Applications, Sensors Magazine Online, Nov. 1, 2003. Retrieved from the Internet Oct. 1, 2012. pp. 1-4. <URL: http://www.sensorsmag.com/sensors/chemical-gas/nanotechnology-enabled-sensors-possibilities-realities-and-a-1074>.
Takeda, S., A New Type of CO2 Sensor Built Up With Plasma Polymerized Polyaniline Thin Fim. Thin Solid Films, 1999, 343-344, 313-316.
Tongol, B. J. V. et al., Surface and Electrochemical Studies of a Carbon Dioxide Probe Based on Conducting Polypyrrole. Sensors and Actuators B: Chemical, 2003, 93, 187-196.
Von Bultzingslöwen, C. et al., Sol-Gel Based Optical Carbon Dioxide Sensor Employing Dual Luminophore Referencing for Application in Food Packaging Technology. The Analyst, 2002, 127, 1478-1483.
Waghuley, S. A. et al., Application of Chemically Synthesized Conducting Polmer-Polypyrrole as a Carbon Dioxide Gas Sensor. Sensors and Actuators B: Chemical, 2008, 128, 366-373.
Wang, L. et al., A Novel Carbon Dioxide Gas Sensor Based on Solid Bielectrolyte. Sensors and Actuators B, 2003, 88, 292-299.
Ward, B. J. et al., Novel processing of NASICON and Sodium Carbonate/Barium Cardonate Thin and Thick Films for A CO2 Microsensor. Journal of Material Science, 2003, 38, 4289-4292.
Williams, D. E. et al., Microstructure Effects on the Response of Gas-Sensitive Resistors Based on Semiconducting Oxides. Sensors and Actuators B: Chemical, 2000, 70, 214-221.
Yang, Y. et al., Development of a NASICON-Based Amperomtric Carbon Dioxide Sensor. Sensors and Actuators B: Chemical, 2000, 62, 30-34.
Zhu, Q. et al., Solid-Electrolyte NASICON Thick Film CO2 Sensor Prepared on Small-Volume Ceramic Tube Substrate. Materials Chemistry and Physics, 2005, 91, 338-342.
International Search Report PCT/CA2007000078 dated May 8, 2007.
Japanese Office Action, P2011-536713 dated Sep. 30, 2013.
European Office Action 09828486.2 dated Oct. 10, 2013.
Angelopoulos, M. et al., Water Soluble Conducting Polyanilines: Applications in Lithography. J of Vacuum Science & Technology, 1993, vol. 11, 2794-2797.
Deore, B. A. et al., Saccharide Imprinting of Poly(aniline boronic acid) in the presence of fluoride. The Analyst, 2003, vol. 128, 803-806.
Deore, B. A. et al., Highly Cross-Linked, Self-Doped Polyaniline Exhibiting Unprecedented Hardness. Chem. Mat., 2005, vol. 17, 3803-3805.
Deore, B. A. et al., Self-Doped Polyaniline Nanoparticle Dispersions Based on Boronic Acid-Phosphate Complexation. Macromolecules, 2009, vol. 42, 164-168.
Deore, B. A. et al., J. Am. A Switchable Self-Doped Polyaniline: Interconversion between Self-Doped and Non-Self-Doped Forms. Chem. Soc., 2004, vol. 126, 52-53.
Deore, B. A. et al., Conducting Poly(anilineboronic acid) Nanostructures: Controlled Synthesis and Characterization. Macromol. Chem. & Phy., 2008, vol. 209, 1094-1105.
Deore, B. A. et al., Reactivity of Poly(anilineboronic acid) with NAD+ and NADH. Chem. Mat., 2005, vol. 17, 2918-2923.

(56) References Cited

OTHER PUBLICATIONS

Deore, B. A. et al., pH Dependent Equilibria of Poly (anilineboronic acid)- Saccharide Complexation in Thin Films. Macromol. Chem. & Phys., 2006, vol. 207, 660-664.

Deore, B. A. et al., Electroactivity of Electrochemically Synthesized Poly(Aniline Boronic Acid) as a Function of pH: Role of Self-Doping: Chem. Mat., 2004, vol. 16, 1427-1432.

Bravo-Grimaldo, E. et al., Metastable Reaction Mixtures for the in Situ Polymerization of Conducting Polymers. Macromolecules, 2007, vol. 40, 7166-7170.

Recksiedler, C. L. et al., Substitution and Condensation Reactions with Poly (anilineboronic acid): Reactivity and Characterization of Thin Films. Langmuir, 2005, vol. 21, 3670-3674.

Cao, T. et al., Self-Assembly and Photovoltaic Property of Covalent-Attached Multilayer Film Based on Highly Sulfonated Polyaniline and Diazoresin. Langmuir, 2002, vol. 18, 750-753.

Chen, X. et al., Ab initio and molecular mechanics (MM3) calculations on alkyl- and arylboronic acids. J. Phys. Org. Chem., 1998, vol. 11, 378-386.

Chidsey, C. E. D. et al., Redox Capacity and Direct Current Electron Conductivity in Electroactive Materials. J. Phys. Chem., 1986, vol. 90, 1479-1484.

Colthup et al., Introduction to Infrared and Raman Spectroscopy, Academic Press, New York, 1975, pp. 335-338.

Cooper, C. R. et al., Selective Fluorescence Detection of Fluoride Using Boronic Acids. Chem. Commun., 1998, 1365-1366.

Crowley, K. et al., An aqueous ammonia sensor based on an inkjet-printed polyaniline nanoparticle-modified electrode. Analyst, 2008, vol. 133, 391-399.

Domaille, P. J. et al., Triphenylborane Methanolysis and Equilibrium Association between Triphenylborane or Diphenylborinate Esters and Alcohols. J. Org. Chem., 1985, vol. 50, 189-194.

Shoji, E. et al., Poly(aniline boronic acid): A New Precursor to Substituted Poly(aniline)s. Langmuir, 2001, vol. 17, 7183-7185.

Shoji, E. et al., Potentiometric Saccharide Detection Based on the pKa Changes of Poly(aniline boronic acid). J. Am. Chem. Soc. 2002, vol. 124, 12486-12493.

Shoji, E. et al., Potentiometric Sensors Based on the Inductive Effect on the pKa of Poly(aniline): A Nonenzymatic Glucose Sensor. J. Am. Chem. Soc., 2001, vol. 123, 3383-3384.

Epstein, A. J. et al., Spectroscopy of Advanced Materials, John Wiley & Sons, New York, 1991, vol. 19, 355-392.

Freund, M. S. et al., A chemically diverse conducting polymer-based "electronic nose" Proc. Natl. Acad. Sci., U.S.A., 1995, vol. 92, 2652-2656.

Freund, M. S. et al., Growth of thin processable films of poly(pyrrole) using phosphomolybdate clusters. Inorg. Chim. Acta, 1995, vol. 240, 447-451.

Freund, M.S. et al., Pyrrole-Phosphomolybdic Acid Solutions as a Means for Producing Conducting Poly(pyrrole) Coatings on Insulating Substrates. Current Separations, 1994, vol. 13, 66-69.

Liu, G. et al., New approach for the Controlled Cross-Linking of Polyaniline Synthesis and Characterization. Macromolecules, 1997, vol. 30, 5660-5665.

Suppes, G. M. et al., A Polypyrrole/Phosphomolybdic Acid Poly(3,4-ethylenedioxythiophene)/Phosphotungstic Acid Asymmetric Supercapacitor. J. Electrochem. Soc., 2010, vol. 157, A1030-A1034.

Gangopadhyay, R. et al., Conducting Polymer Nanocomposites: A Brief Overview. Chem. Mater, 2000, vol. 12, 608-622.

Geng, Y. H. et al., Water soluble polyaniline and its blend films prepared by aqueous solution casting. Polymer, 1999, vol. 40, 5723-5727.

Greenspan, Humidity Fixed Points of Binary Saturated Aqueous Solutions. Journal of the Research National Bureau of Standards-A, Physics and Chemistry, 1977, vol. 81(1), 89-96.

Heeger, Semiconducting and Metallic Polymers: The Fourth Generation of Polymeric Materials (Nobel Lecture). A. J., Angew. Chem., Int. Ed., 2001, vol. 40, 2591-2611.

Hong, S. et al., A New Tool for Studying the in situ Growth Processes for Self-Assembled Monolayers under Ambient Conditions. Langmuir, 1999, vol. 15, 7897-7900.

Hu et al., PEO-PPO-PEO Triblock copolymer/Nafion blend as membrane material for intermediate temperature DMFCs. Journal of Applied Electrochemistry, 2008, vol. 38(4), 543-550.

Huang, W.S. et al., Polyaniline, A Novel Conducting Polymer. Morphology and Chemistry of its Oxidation and Reduction in Aqueous Eletrolytes. J. Chem. Soc. Faraday Trans., 1986, vol. 82, 2385-2400.

English, J. T. et al., Biogenic Amine Vapour Detection Using Poly(anilineboronic acid) Films. Sensors & Actuators: B., 2006, vol. 115, 666-671.

Jang J., Conducting Polymer Nanomaterials and Their Applications. Adv. Polym. Sci., 2006, vol. 199, 189-259.

Jang, J. et al., Fabrication of water-Dispersible Polyaniline-Poly(4-styrenesulfonate) Nanoparticles for Inkjet-Printed Chemical-Sensor Applications. Adv. Mater., 2007, vol. 19, 1772.

Jang, J. et al., Organic Light-Emitting Diode With Polyaniline-PolyZ(Styrene Sulfonate) as a Hole Injection Layer. Thin Solid Films, 2008, vol. 516, 3152-3156.

Jayas et al., Evaluation of a Computer-Controlled Ventilation System for a Potato Storage Facility. Canadian Biosystems Engineering, 2001, vol. 43(5), 5.5-5.12.

Jensen et al., Response Time Characteristics of the pCO2 Electrode. Analytical Chemistry, 1979, vol. 51(12), 1972-1977.

Jones, The Uses of Carbon Dioxide—I. Methods of Manufacture and Marketing-Uses in Food Products Industry-Low Temperature Applications. Canadian Chemistry and Metallurgy, 1923, vol. 7(7), 172-175.

Kahol, P. K. et al., On Metallic Characteristics in Some Conducting Polymers. Synth Met., 2005, vol. 151, 65-72.

Kameta, N. et al., Fluorescence-responsive H2PO4—Receptor Based on Macrocyclic Boron Complex. Chem. Lett., 2006, vol. 35, 536-537.

Kang, E. T. et al., Polyaniline: A Polymeer With Many Interesting Intrinsic Redox States. Prog. Polym. Sci., 1998, vol. 23, 277-324

Kim, D. H. et al., Borate-Nucleotide Complex Formation Depends on Charge and Phosphorylation State. Mass Spectrom., 2004, vol. 39, 743-751.

Kim, D. H. et al., Esterification of Borate With NAD+ and NADH As Studied by Electrospray Ionization Mass Spectrometry and 11B NMR Spectrometry. Mass Spectrom., 2003, vol. 38, 632-640.

Kitty, K. Y. et al., Communications. Efficient Photodetectors Fabricated from a Metal-Containing Conjugated Polymer by a Multilayer Deposition Process. Chem. Mater., 2004, vol. 16, 365-367.

Konagaya, S. et al., Conductive Polymer Composite PET Film With Excellent Antistatic Properties. Plastics, Rubber and Composites, 2002, vol. 31, 201-204.

Li, C. et al., Electrostatic Layer-by-layer Assembly of Poly (amidoamine) Dendrimer Conducting Sulfonated Polyaniline: Structure and Properties of Multilayer Films. Macromolecules, 2003, vol. 36, 9957-9965.

Li, G. et al., Controlled Electrphoretic Patterning of Polyaniline From A Colloidal Suspension, J. Am. Chem. Soc., 2005, vol. 127, 4903-4909.

Int'l Search Report from WO 2010/060195 A1, Published Jun. 3, 2010.

Li, W. et al., Fabrication and Characterization of Optically Active Multilayer Thin films Based on Polyaniline Colloids. Langmuir, 2003, vol. 19, 4639-4644.

Luckachova, L. V. et al., Electroactivity of Chemically Synthesized Polyaniline in Neutral and Alkaline Aqueous Solutions. J. Electroanal. Chem., 2003, vol. 544, 59-63.

Luo, J. et al., Stable Aqueous Dispersion of Conducting Polyaniline With High Electrical Conductivity. Macromolecules, 2007, vol. 40, 8132-8135.

MacDiarmid, A.G., Synthetic Metals: A Novel Role for Organic Polymers (Nobel Lecture). Angew Chem., Int. Ed., 2001, vol. 40, 2581-2590.

McFarlane, S. L. et al., A One-Step, Organic-Solvent Processable Synthesis of PEDOT Thin films via in Situ Metastable Chemical Polymerization. Macromol., 2010, vol. 43, 10241-10245.

(56) References Cited

OTHER PUBLICATIONS

Marazuela et al., Luminescence Lifetime Quenching of a Ruthenium(II) Polypyridyl Dye for Optical Sensing of Carbon Dioxide. Applied Spectroscopy, 1998, vol. 52(10), 1314-1320.
Muir et al., Carbon Dioxide as an Early Indicator of Stored Cereal and Oilseed Spoilage. Transactions of the ASAE, 1985, vol. 28, 1673-1675.
Neethirajan et al., Carbon Dioxide (CO2) Sensors for the Agri-Food Industry—A Review. Food and Bioprocess Technology, 2009, vol. 2(2), 115-121.
Neoh, K. G. et al., Structural Study of Polyaniline Films in Reprotonation/Deprotonation Cycles. J. Phys. Chem., 1991, vol. 95, 10151-10156.
Nicolas M. et al., New Boronic-Acid- and Boronate-Substituted Aromatic Compounds as Precursors of Fluoride-Responsive Conjugated Polymer Films. Eur. J. Org. Chem., 2000, vol. 9, 1703-1710.
Parvatikar et al., Electrical and Humidity Sensing Properties of Polyaniline/WO3 Composites. Sensors and Actuators B, 2006, vol. 114, 599-603.
Rego et al., Carbon Dioxide/Methane Gas Sensor Based on the Permselectivity of Polymeric Membranes for Biogas Monitoring. Sensors and Actuators B, 2004, vol. 103, 2-6.
Semple et al., Section 6—Inspection and Detection Methods for Storage Insect Pests. Section 6 of Proceedings of the Integrated Pest Management Strategies in Grain Storage Systems Conference National Post Harvest Institute for Research and Extension, Department of Agriculture, Jun. 6-18, 1988, Philippines <URL: http://www.fao.org/docrep/x5048e/x5048E0d.htm#Section 6—Inspection and detection methods for storage insect pests>. pp. 1-18, Dated Oct. 19, 2012.
Shimizu, S. et al., Synthesis and Applications of Sulfonated Polyaniline. Synth. Met., 1997, vol. 85, 1337-1338.
Shirakawa, H., Nobel Prize in Chemistry 2000 Electrically Conductive Plastic. The Discovery of Polyacetylene Film: The Dawning of an Era of Conducting Polymers (Nobel Lecture). Angew. Chem., Int. Ed., 2001, vol. 40, 2575-2580.
Singh et al., Finite Element Modelling of Carbon Dioxide Diffusion in Stored Wheat. Canadian Agricultural Engineering, 1983, vol. 25, 149-152.
Skotheim et al., Electrochemistry of Conducting Polymers. Handbook of Conducting Polymers, Second Edition. Boca Raton, Fla., CRC Press, 1998, pp. 531-575.
Smolander et al., Leak Indicators for Modified-Atmosphere Packages. Trends in Food Science and Technology, 1997, vol. 8, 101-106.
Socrates, Infrared and Raman Characteristic Group Frequencies, Tables and Charts, 2nd ed., John Wiley & Sons, New York, 1994, pp. 107-114, 247-253, and 259-282.
Solomon, Bulletin of Entomological Research. Control of Humidity with Potassium Hydroxide, Sulphuric Acid, or Other Solutions. Stereocontrolled Total synthesis of (-)-Anisatin: A Neurotoxic Sesquiterpenoid Possessing a Novel Spiro Beta-Lactone. 1951, vol. 42, 543-554.
Sood, A. et al., Boron-Containing Nucleic Acids, Synthesis of Oligodeoxynucleoside Boranophosphates. J. Am. Chem. Soc., 1990, vol. 112, 9000-9001.
Springsteen, G. et al, The relationship Among pKa, pH, and Binding Constants in the Interactions Between Boronic Acids and Diols—it is not as simple as it appears. Tetrahedron, 2004, vol. 60, 11205-11209.
Springsteen, G. et al., A Detailed Examination of Boronic Acid-Diol Complexation. Tetrahedron, 2002, vol. 58, 5291-2300.
Stafstrom S. et al., Polaron Lattice in Highly Conducting Polyaniline: Theorectical and Optical Studies. Phys. Rev. Lett., 1987, vol. 59, 1464-1467.
Spinks, G. M. et al., Electrective Conducting Polymers for Corrosion Control. J. Solid State Electrochem., 2002, vol. 6, 85-100.
Tan et al., Freeze Damage Detection in Oranges Using Gas Sensors. Post Harvest Biology and Technology, 2005, vol. 35, 177-182.
Virji et al., Polyaniline Nanofiber Gas Sensors examination of Response Mechanisms. Nanoletters, 2004, vol. 4, 491.
Viswanathan et al., Is Nafion, The Only Choice? Bulletin of the Catalysis Society of India, 2007, vol. 6, 50-66.
Wessling, B., Progress in Science and Technology of Polyaniline and Poly-ethylenedioxythiophene. Synth. Met., 2003, vol. 135, 265-267.
Westmark, P.R. et al., Influence of Eluent Anions in Boronate Affinity Chromatography. J. Chromatogr., A, 1994, vol. 664, 123-128.
Wudl, F. et al., Poly(p-phenyleneamineimine): Synthesis and Comparison to Polyaniline. J. Am. Chem. Soc., 1987, vol. 109, 3677-3684.
Yu, I. et al., Thermal Stability of High Molecular weight Self-Doped Poly(anilineboronic acid). Macromolecules, 2005, vol. 38, 10022-10026.
Zhang C. et al., In Situ Study of the Conductivity of the Eletrochemically Deposited Polyaniline Film Using a Dual-Disk Microelectrode. J. Electroanal. Chem., 1997, vol. 440, 35-39.
Barsan, N. et al., Conduction Model of Metal Oxide Gas Sensors. Journal of Electroceramics, 2001, 7, 143-167.
Colin, F. et al., Modification of a Piezo-Optical Gas Dosimeter System Towards Continuous Gas Sensing: A Feasibility Study With Carbon Dioxide. Sensors and Actuators B: Chemical, 2003, 90, 216-221.
Cui, G. et al., Potentiometric pCO2 Sensor Using Polyaniline-coated pH-sensitive Electrodes. The Analyst, 1998, 123, 1855-1859.
Fabre, B. et al., Poly(Aniline Boronic Acid)-Based Conductimetric Sensor of Dopamine. Chemical Communications, 2003, 24, 2982-2983.
Fernando, W. G. D. et al., Identification and Use of Potential Bacterial Organic Antifungal Volatiles in Biocantrol. Soil Biology and Biochemistry, 2005, 37, 955-964.
Haeusler, A. et al., A Novel Thick Film Conductive Type CO2 Sensor. Sensors and Actuators B: Chemical, 1996, 34, 388-395.
Herber, S. et al., A Miniaturized Carbon Dioxide Gas Sensor Based on Sensing of pH-Sensitive Hydrogel Swelling With a Pressure Sensor. Biomedical Microdevices, 2005, 7, 197-204.
Hooker, S. A. et al., Nanotechnology Advantages Applied to Gas Sensor Development. The Nanoparticles 2002 Conference Proceedings, Norwalk, Connecticut, 2002. Business Communications Company Inc. pp. 1-7.
Ileliji, K. E. et al., Detection of a Developing Hot Spot in Stored Corn With a CO2 Sensor. Applied Engineering in Agriculture, 2006, 22, 275-289.
Irimia-Vladu, M. et al., Suitability of Emeraldine Base Polyaniline-PVA Composite Film for Carbon Dioxide Sensing. Synthetic Metals, 2006, 156, 1401-1407.
Jasinski, G. et al., Eletrocatalytic Gas Sensors Based on Nasicon and Lisicon. Materials Science-Poland, 2006, 24, 261-268.
Kaneyasu, K. et al., A Carbon Dioxide Gas Sensor Based on Solid Electrolyte for Air Quality Control. Sensors and Actuators B: Chemical, 2000, 66, 56-58.
Kim D. H. et al., CO2-Sensing Characteristics of SnO2 Thick Film by Coating Lanthanum Oxide. Sensors and Actuators B: Chemical, 2000, 62, 61-66.
Kinkade, B. R., Bringing Nondispersive IR Spectroscopic Gas Sensors to the Mass Market. Sensors Magazine, 2000, 9, 11-21.
Lee, D-D. et al., Carbon Dioxide Sensor Using NASICON Prepared by The Sol-Gel Method. Sensors and Actuators B: Chemical, 1995, 25, 607-609.
Li, G. et al., Effect of Thermal Excitation on Intermolecular charge Transfer Efficiency in Conducting Polyaniline. Applied Physics Letters, 2004, 85, 1187-1189.
Capone, S. et al., "Solid State Gas Sensors: State of the Art and Future Activities". Journal of Optoelectronics and Advanced Materials, 2003, 5, 1335-1348.
Suzuki, L. et al., "An Integrated Module for Sensing p02, pC02, and pH". Analytica Chimica Acta, 2009, 405, 57-65.

* cited by examiner

SELF-DOPED POLYANILINE NANOPARTICLE DISPERSIONS BASED ON BORONIC ACID-PHOSPHATE COMPLEXATION

CROSS REFERENCE TO RELATED APPLICATIONS

This application claims the benefit of U.S. Provisional Patent Application Ser. No. 61/117,841 entitled "SELF-DOPED POLYANILINE NANOPARTICLE DISPERSIONS BASED ON BORONIC ACID-PHOSPHATE COMPLEXATION" filed on Nov. 25, 2008, which is incorporated herein by reference in its entirety.

TECHNICAL FIELD

This invention relates to a method of producing a self-doped conducting polymer having a boronic acid moiety complexed with a phosphate moiety.

BACKGROUND

Conducting polymers exhibit semiconductor or metal-like electrical and optical properties while at the same time they are lightweight, flexible, inexpensive, and easy to synthesize.[1-3] However, the poor processability and stability of conducting polymers remains a hurdle to their use in commercial applications. The limitations in postsynthesis processability are due to the chain stiffness and interchain interactions such as chemical or ionic crosslinking rendering these materials insoluble in common solvents. In order to overcome these problems, several pre- and postsynthesis approaches have been developed including the reduction of polymer to non-conducting state, alkyl substitution, counterion induced processability, enzyme synthesis, in-situ polymerization of metastable monomer-oxidant mixtures, self-doping and colloidal dispersions.[4] Recently, the restrictions on the use of organic solvents, due to environmental concerns, have encouraged the production of conducting polymers processable from aqueous media. In particular, colloidal dispersions and self-doped form of polyanilines (PANI) have been synthesized widely in aqueous media since they can be directly used in coatings,[5-7] molecular level processing[8-11] lithography,[12,13] electrophoretic patterning,[14] and inkjet printing[15,16] for practical applications including chemical and biological sensors, antistatic coatings, corrosion protection, electrochromic devices and energy storage. Stable dispersions of PANI colloidal particles are commonly obtained by chemical and electrochemical methods in the presence of surfactants and polymeric steric stabilizers.[17,18] During polymerization, steric stabilizers adsorb on the surface of growing PANI particles and prevent their aggregation and further macroscopic precipitation. For example, it has been reported that PANI can be dispersed in water and different organic solvents by using counterions such as poly(styrene sulfonate), poly(methyl methacrylate) and p-toluenesulfonate.[19,20] The preparation of stable aqueous dispersions of PANI using phosphoric acid dopants with long and short hydrophilic ethylene glycol segments has been reported.[21-22]

Aromatic boronic acids are known to bind compounds containing diol moieties such as carbohydrates, vitamins, coenzymes and ribonucleic acids[23] as well as fluoride[24,25] with high affinity through reversible ester formation. These interactions have been used to facilitate the chemical synthesis of water soluble PABA under the polymerization conditions in the presence of sodium fluoride and excess D-fructose.[26] Self-doped PABA produced with this method has several advantages, including water solubility, good conductivity, and higher molecular weight. In addition, the intermolecular reaction between boronic acid groups and imines in PABA containing fluoride result in self-doped, self-crosslinked PABA with enhanced mechanical properties.[27] The synthesis of self-doped, alcohol-soluble PABA through boronic acid complexation with aliphatic alcohols and the manipulation of PABA morphology, i.e., nanostructures, with different shapes and forms through exchange of internal and external dopants have been reported.[28] The strong interaction of boron compounds such as borane, boric acid and its ester with anions such as phosphate has been reported.[29,30] The binding of boron to phosphorous in boranophosphate compounds is reportedly air stable and has hydrolytic stability in both acid and base.[29]

The corrosion protection of steel substrates by surface treatments such as the application of a zinc layer and the rinsing with chromate coating agents is common practice. However, the hexavalent form of chromate is highly toxic and has been linked to carcinogenic effects. Since both zinc and chromium are heavy metals, there is a keen interest in reducing their introduction to the environment. Recently, conducting polymers have been investigated as a promising candidate either as corrosion inhibitors or in protective coatings.[52] Electronically conducting polymers act as transitional electron carriers between the stainless steel surface and the surrounding aqueous environment, passivating and protecting the steel from corrosion. The degree of corrosion protection provided by conducting polymer coatings mainly depends on both its structural and electronic properties.

SUMMARY

According to one embodiment, there is provided a method for producing a polymer, which method may comprise mixing, in any order: a monomer having a boronic acid moiety, or a salt thereof; a compound having a phosphate moiety; a compound having a fluoride moiety; and an oxidizing agent, in the presence of a solvent.

According to another embodiment, there is provided a polymer produced by the method as described anywhere herein.

According to a further embodiment, there is provided a dispersion comprising the polymer as described anywhere herein and a solvent.

According to another embodiment, there is provided a method of preparing an anti-corrosive polymer comprising: mixing, in any order, a monomer having a boronic acid moiety, or a salt thereof, a compound having a fluoride moiety and an oxidizing agent in the presence of an aqueous acid or an aliphatic alcohol.

BRIEF DESCRIPTION OF THE DRAWINGS

In the accompanying drawings, which illustrate an exemplary embodiment.

DETAILED DESCRIPTION

Figure 1:
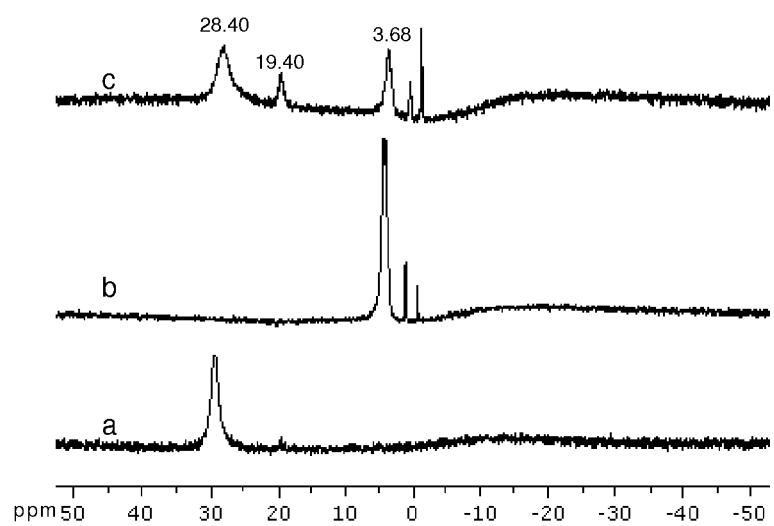
FIG. 1 depicts $^{11}$B NMR spectra of monomer solution (a) 10 mM 3-APBA in 0.1 M phosphoric acid, (b) 10 mM 3-APBA+50 mM NaF in 0.1 M phosphoric acid and (c) polymer dispersion prepared using 10 mM 3-APBA+50 mM NaF+5 mM of ammonium persulfate in 0.1 M phosphoric acid and purified using 0.1 M phosphoric acid.

This invention relates, in part, to an approach for synthesizing stable poly(anilineboronic acid) (PABA) dispersions in phosphoric acid using the complexation between the substituent boronic acid moiety on the PANI backbone and phosphate.

In an embodiment, there is provided a method for producing a polymer, which method comprises mixing, in any order: a monomer having a boronic acid moiety, or a salt thereof; a compound having a phosphate moiety; a compound having a fluoride moiety; and an oxidizing agent.

In an embodiment, the monomer having a boronic acid moiety may be, for example, and without limitation, a monomer that can undergo oxidative polymerization. In an embodiment, the monomer having a boronic acid moiety may be, for example, and without limitation, a monomer capable of forming a conducting polymer. In an embodiment, the monomer having a boronic acid moiety may be, for example, and without limitation, a monomer that contains a boron that is anionic or can be converted into an anion (for example, sp3 form) through complexation with a ligand. In an embodiment, the monomer having a boronic acid moiety may be, for example, and without limitation, a monomer that contains a boron that is anionic or can be converted into an anion (for example, sp3 form) through complexation with a fluoride moiety. In an embodiment, the monomer may be, for example, and without limitation, an aromatic boronic acid or a salt thereof. In an embodiment, the monomer may be, for example, and without limitation, boronic acid substituted aniline or a salt thereof, boronic acid substituted pyrrole or a salt thereof, or boronic acid substituted thiophene or a salt thereof. In an embodiment, the monomer may be, for example, and without limitation, 3-aminophenyl boronic acid or a salt thereof. In an embodiment, the monomer may be, for example, and without limitation, 3-aminophenylboronic acid hydrochloride salt.

Suitable compounds having a phosphate moiety would be understood to and can be determined by those of ordinary skill in the art. In an embodiment, the compound having a phosphate moiety may be, for example, and without limitation, a compound having a phosphate moiety that is available for interacting with boron. In an embodiment, the compound having a phosphate moiety may be, for example, and without limitation, a compound having a phosphate moiety that is available for interacting with boron of the monomer having a boronic acid moiety. In an embodiment, the compound having a phosphate moiety may be, for example, and without limitation, a compound having a phosphate moiety that is available for complexing with boron of the monomer having a boronic acid moiety. In an embodiment, the compound having a phosphate moiety may be, for example, and without limitation, an acid, a salt, an oligomer, a resin or a polymer having a phosphate moiety that is free to interact or complex with boron of the monomer having a boronic acid moiety. In an embodiment, the compound having a phosphate moiety may be, for example, and without limitation, capable of providing cross-links between polymer chains of the produced polymer. In an embodiment, the compound having a phosphate moiety may be, for example, and without limitation, a phosphate salt. In an embodiment, the compound having a phosphate moiety may be, for example, and without limitation, sodium phosphate, potassium phosphate, rubidium phosphate, caesium phosphate or ammonium phosphate. In an embodiment, the compound having a phosphate moiety may be, for example, and without limitation, sodium phosphate or potassium phosphate. In an embodiment, the compound having a phosphate moiety may be, for example, and without limitation, poly(vinylphosphonic acid) (PVPA). In an embodiment, the compound having a phosphate moiety may be, for example, and without limitation, phosphoric acid.

Suitable compounds having a fluoride moiety would be understood to and can be determined by those of ordinary skill in the art. In an embodiment, the compound having a fluoride moiety may be, for example, and without limitation, a compound having a fluoride moiety that is available for complexing to boron of the monomer having a boronic acid moiety. In an embodiment, the compound having a fluoride moiety may be, for example, and without limitation, a soluble salt containing a fluoride moiety. In an embodiment, the compound having a fluoride moiety may be, for example, and without limitation, a soluble salt containing a fluoride moiety that is capable of releasing free $F^-$. In an embodiment, the soluble salt may be, for example, and without limitation, a water soluble salt. In an embodiment, the compound having a fluoride moiety may be, for example, and without limitation, sodium fluoride, lithium fluoride or potassium fluoride. In an embodiment, the compound having a fluoride moiety may be, for example, and without limitation, sodium fluoride.

Suitable oxidizing agents would be understood to and can be determined by those of ordinary skill in the art. In an embodiment, the oxidizing agent may be, for example, and without limitation, an oxidizing agent capable of forming sufficient concentrations of an oxidized form of the polymer to permit polymerization. In an embodiment, the oxidizing agent may be, for example, and without limitation, ammonium persulfate, ferric chloride, potassium dichromate, potassium permanganate or iodine. In an embodiment, the oxidizing agent may be, for example, and without limitation, a peroxide. In an embodiment, the oxidizing agent may be, for example, and without limitation, ammonium persulfate.

In an embodiment, for example, and without limitation, the method for producing a polymer may comprise mixing, in any order: a monomer having a boronic acid moiety, or a salt thereof; a compound having a phosphate moiety; a compound having a fluoride moiety; and an oxidizing agent, in the presence of a solvent.

Suitable solvents would be understood to and can be determined by those of ordinary skill in the art. In an embodiment, the solvent may be, for example, and without limitation, a coordinating solvent (i.e., a solvent containing an OH). In an embodiment, the solvent may be, for example, and without limitation, water or an aliphatic alcohol. In an embodiment, the solvent may be, for example, and without limitation, water, methanol, ethanol, 1-propanol, isopropanol, butanol or octanol. In an embodiment, the solvent may be, for example, and without limitation, water.

In an embodiment, there is provided a method for producing a polymer, which method comprises: mixing a monomer having a boronic acid moiety, or a salt thereof, and a compound having a fluoride moiety in the presence of a compound having a phosphate moiety; and polymerizing using an oxidizing agent.

In an embodiment, there is provided a method for producing a polymer, which method comprises: mixing a monomer having a boronic acid moiety, or a salt thereof, and a compound having a fluoride moiety in the presence of a compound having a phosphate moiety and a solvent; and polymerizing using an oxidizing agent.

In an embodiment, there is provided a method for producing a polymer, which method comprises: mixing a monomer having a boronic acid moiety, or a salt thereof, and a compound having a fluoride moiety in the presence of aqueous phosphoric acid; and polymerizing using an oxidizing agent.

In an embodiment, for example, and without limitation, the method may further comprise isolating and/or purifying the polymer. Suitable isolation and/or purification methods would be understood to and can be determined by those of ordinary skill in the art. For example, and without limitation, those of ordinary skill in the art would understand that the polymer may be isolated and/or purified by centrifugation. For example, and without limitation, those of ordinary skill in the art would understand that the polymer may be isolated and/or purified by centrifugation and/or dispersing the polymer in a solvent. In an embodiment, the polymer may be, for example, and without limitation, isolated with an anion. In an embodiment, the anion may be from, for example, and without limitation, formic acid, acetic acid, phosphoric acid, p-toluenesulfonic acid, sodium dodecyl sulfate or sodium dodecyl benzene sulfonate. For example, and without limitation, those of ordinary skill in the art would understand that the polymer may be isolated and/or purified by centrifugation and/or dispersed in a solvent and a compound having a phosphate moiety. For example, and without limitation, those of ordinary skill in the art would understand that the polymer may be isolated by centrifugation and subsequently purified by using aqueous phosphoric acid.

In an embodiment, for example, and without limitation, the method may further comprise dispersing the polymer in a solvent. In an embodiment, the solvent in which the polymer is dispersed may or may not be the same solvent used during the polymerization step. In an embodiment, the solvent may comprise, for example, and without limitation, an acid. In an embodiment, for example, and without limitation, the method may further comprise dispersing the polymer in a solvent and a compound having a phosphate moiety. In an embodiment, the solvent may be, for example, and without limitation, a coordinating solvent (i.e., a solvent containing an OH). In an embodiment, the solvent may be, for example, and without limitation, water or an aliphatic alcohol. In an embodiment, the solvent may be, for example, and without limitation, water, methanol, ethanol, 1-propanol, isopropanol, butanol or octanol. In an embodiment, the solvent may be, for example, and without limitation, water. In an embodiment, for example, and without limitation, the dispersion may comprise a solvent and phosphoric acid. In an embodiment, the dispersion may comprise, for example, and without limitation, aqueous phosphoric acid.

In an embodiment, there is also provided a polymer produced by the method as described anywhere herein.

In an embodiment, the polymer produced by the method may be, for example, and without limitation, a self-doped polymer. In an embodiment, the polymer may be, for example, and without limitation, a conducting polymer. In an embodiment, the polymer may be, for example, and without limitation, water soluble. In an embodiment, the polymer may be, for example, and without limitation, a cross-linked polymer. In an embodiment, the polymer may be, for example, and without limitation, a poly(anilineboronic acid)/phosphate polymer. In an embodiment, the polymer may be, for example, and without limitation, a polymer having a boronphosphate complex containing fluoride. In an embodiment, the polymer may be, for example, and without limitation, a self-doped conducting polymer having a boron-phosphate complex containing fluoride.

In an embodiment, the polymer may be, for example, and without limitation, in the form of a nanostructure. In an embodiment, the polymer may be, for example, and without limitation, in the form of a nanoparticle. In an embodiment, the polymer may have, for example, and without limitation, a spherical shape or an irregular shape. In an embodiment, the polymer may have, for example, and without limitation, an irregular shape.

In an embodiment, the particle size of the polymer, may be for example, and without limitation, from about 1 to about 100 nm, from about 2 to about 100 nm, from about 5 to about 100 nm, from about 10 to about 100 nm, from about 15 to about 100 nm, from about 20 to about 100 nm, from about 25 to about 100 nm, from about 30 to about 100 nm, from about 35 to about 100 nm, from about 45 to about 100 nm, from about 50 to about 100 nm, from about 55 to about 100 nm, from about 60 to about 100 nm, from about 65 to about 100 nm, from about 70 to about 100 nm, from about 75 to about 100 nm, from about 80 to about 100 nm, from about 85 to about 100 nm, from about 90 to about 100 nm, from about 95 to 100 nm, from about 20 to about 55 nm, from about 25 to about 55 nm, from about 30 to about 55 nm, from about 35 to about 55 nm, from about 40 to about 55 nm, from about 45 to about 55 nm, from about 50 to about 55 nm, from about 25 to about 50 nm, from about 30 to 50 nm, from about 35 to 50 nm, from about 40 to 50 nm, from about 45 to 50 nm, from about 25 to 45 nm, from about 30 to 45 nm, from about 35 to 45 nm, from about 40 to 45 nm, from about 25 to 40 nm, from about 30 to 40 nm, from about 35 to 40 nm, from about 25 to 35 nm, from about 30 to about 35 nm, from about 25 to about 30 nm, and including any specific ranges or any specific values within these ranges.

In an embodiment, for example, and without limitation, the polymer may be in the form of a film or of a coating.

This invention also relates, in part, to the anticorrosive properties of a poly(anilineboronic acid)-based polymer for protecting a substrate.

In an embodiment, there is provided a method of preparing an anti-corrosion composition comprising: mixing, in any order: a monomer having a boronic acid moiety, or a salt thereof; a compound having a phosphate moiety; a compound having a fluoride moiety; and an oxidizing agent.

In an embodiment, for example, and without limitation, the method for producing an anti-corrosion composition may comprise mixing, in any order: a monomer having a boronic acid moiety, or a salt thereof; a compound having a phosphate moiety; a compound having a fluoride moiety; and an oxidizing agent, in the presence of a solvent.

In an embodiment, there is provided a method for producing an anti-corrosion composition, which method comprises: mixing a monomer having a boronic acid moiety, or a salt thereof, and a compound having a fluoride moiety in the presence of a compound having a phosphate moiety; and polymerizing using an oxidizing agent.

In an embodiment, there is provided a method for producing an anti-corrosion composition, which method comprises: mixing a monomer having a boronic acid moiety, or a salt thereof, and a compound having a fluoride moiety in the presence of a compound having a phosphate moiety and a solvent; and polymerizing using an oxidizing agent.

In an embodiment, there is provided a method for producing an anti-corrosion composition, which method comprises: mixing a monomer having a boronic acid moiety, or a salt thereof, and a compound having a fluoride moiety in the presence of aqueous phosphoric acid; and polymerizing using an oxidizing agent.

In an embodiment, there is provided a method of preparing an anti-corrosion composition comprising: mixing, in any order, a monomer having a boronic acid moiety, or a salt thereof, a compound having a fluoride moiety and an oxidizing agent in the presence of an aqueous acid or an aliphatic alcohol.

In an embodiment, there is provided a method of preparing an anti-corrosion composition comprising: mixing a monomer having a boronic acid moiety, or a salt thereof, and a compound having a fluoride moiety in the presence of an aqueous acid or an aliphatic alcohol; and polymerizing using an oxidizing agent.

In an embodiment, the method may further comprise, for example, and without limitation, applying the anti-corrosion composition on a substrate.

In an embodiment, there is provided a method of preparing an anti-corrosion polymer comprising: mixing, in any order: a monomer having a boronic acid moiety, or a salt thereof; a compound having a phosphate moiety; a compound having a fluoride moiety; and an oxidizing agent.

In an embodiment, for example, and without limitation, the method for producing an anti-corrosion polymer may comprise mixing, in any order: a monomer having a boronic acid moiety, or a salt thereof; a compound having a phosphate moiety; a compound having a fluoride moiety; and an oxidizing agent, in the presence of a solvent.

In an embodiment, there is provided a method for producing an anti-corrosion polymer, which method comprises: mixing a monomer having a boronic acid moiety, or a salt thereof, and a compound having a fluoride moiety in the presence of a compound having a phosphate moiety; and polymerizing using an oxidizing agent.

In an embodiment, there is provided a method for producing an anti-corrosion polymer, which method comprises: mixing a monomer having a boronic acid moiety, or a salt thereof, and a compound having a fluoride moiety in the presence of a compound having a phosphate moiety and a solvent; and polymerizing using an oxidizing agent.

In an embodiment, there is provided a method for producing an anti-corrosion polymer, which method comprises: mixing a monomer having a boronic acid moiety, or a salt thereof, and a compound having a fluoride moiety in the presence of aqueous phosphoric acid; and polymerizing using an oxidizing agent.

In an embodiment, there is provided a method of preparing an anti-corrosion polymer comprising: mixing, in any order, a monomer having a boronic acid moiety, or a salt thereof, a compound having a fluoride moiety and an oxidizing agent in the presence of an aqueous acid or an aliphatic alcohol.

In an embodiment, there is provided a method of preparing an anti-corrosion polymer comprising: mixing a monomer having a boronic acid moiety, or a salt thereof, and a compound having a fluoride moiety in the presence of an aqueous acid or an aliphatic alcohol; and polymerizing using an oxidizing agent.

In an embodiment, the method may further comprise, for example, and without limitation, applying the anti-corrosion polymer on a substrate.

In an embodiment, the monomer having a boronic acid moiety may be, for example, and without limitation, a monomer that can undergo oxidative polymerization. In an embodiment, the monomer having a boronic acid moiety may be, for example, and without limitation, a monomer capable of forming a conducting polymer. In an embodiment, the monomer having a boronic acid moiety may be, for example, and without limitation, a monomer that contains a boron that is anionic or can be converted into an anion (for example, sp3 form) through complexation with a ligand. In an embodiment, the monomer having a boronic acid moiety may be, for example, and without limitation, a monomer that contains a boron that is anionic or can be converted into an anion (for example, sp3 form) through complexation with a fluoride moiety. In an embodiment, the monomer may be, for example, and without limitation, an aromatic boronic acid or a salt thereof. In an embodiment, the monomer may be, for example, and without limitation, boronic acid substituted aniline or a salt thereof, boronic acid substituted pyrrole or a salt thereof, or boronic acid substituted thiophene or a salt thereof. In an embodiment, the monomer may be, for example, and without limitation, 3-aminophenyl boronic acid or a salt thereof. In an embodiment, the monomer may be, for example, and without limitation, 3-aminophenylboronic acid hydrochloride salt.

Suitable compounds having a fluoride moiety would be understood to and can be determined by those of ordinary skill in the art. In an embodiment, the compound having a fluoride moiety may be, for example, and without limitation, a compound having a fluoride moiety that is available for complexing with boron of the monomer having a boronic acid moiety. In an embodiment, the compound having a fluoride moiety may be, for example, and without limitation, a soluble salt containing a fluoride moiety. In an embodiment, the compound having a fluoride moiety may be, for example, and without limitation, a soluble salt containing a fluoride moiety that is capable of releasing free $F^-$. In an embodiment, the soluble salt may be, for example, and without limitation, a water soluble salt. In an embodiment, the compound having a fluoride moiety may be, for example, and without limitation, sodium fluoride, lithium fluoride or potassium fluoride. In an embodiment, the compound having a fluoride moiety may be, for example, and without limitation, sodium fluoride.

Suitable oxidizing agents would be understood to and can be determined by those of ordinary skill in the art. In an embodiment, the oxidizing agent may be, for example, and without limitation, an oxidizing agent capable of forming sufficient concentrations of an oxidized form of the polymer to permit polymerization. In an embodiment, the oxidizing agent may be, for example, and without limitation, ammonium persulfate, ferric chloride, potassium dichromate, potassium permanganate or iodine. In an embodiment, the oxidizing agent may be, for example, and without limitation, a peroxide. In an embodiment, the oxidizing agent may be, for example, and without limitation, ammonium persulfate.

Suitable compounds having a phosphate moiety would be understood to and can be determined by those of ordinary skill in the art. In an embodiment, the compound having a phosphate moiety may be, for example, and without limitation, a compound having a phosphate moiety that is available for interacting with boron. In an embodiment, the compound having a phosphate moiety may be, for example, and without limitation, a compound having a phosphate moiety that is available for interacting with boron of the monomer having a boronic acid moiety. In an embodiment, the compound having a phosphate moiety may be, for example, and without limitation, a compound having a phosphate moiety that is available for complexing with boron of the monomer having a boronic acid moiety. In an embodiment, the compound having a phosphate moiety may be, for example, and without limitation, an acid, a salt, an oligomer, a resin or a polymer having a phosphate moiety that is free to interact or complex with boron of the monomer having a boronic acid moiety. In an embodiment, the compound having a phosphate moiety may be, for example, and without limitation, capable of providing cross-links between polymer chains of the produced anti-corrosive polymer. In an embodiment, the compound having a phosphate moiety may be, for example, and without limitation, a phosphate salt. In an embodiment, the compound having a phosphate moiety may be, for example, and without limitation, sodium phosphate, potassium phosphate, rubidium phosphate, caesium phosphate or ammonium phosphate. In an embodiment, the compound having a phosphate moiety may be, for example, and without limitation, sodium phosphate or potassium phosphate. In an embodiment, the compound having a phosphate moiety may be, for example, and without limitation, poly(vinylphosphonic acid) (PVPA). In an embodiment, the compound having a phosphate moiety may be, for example, and without limitation, phosphoric acid.

Suitable aliphatic alcohols would be understood to and can be determined by those of ordinary skill in the art. In an embodiment, the aliphatic alcohol may be, for example, and without limitation, an anhydrous alcohol. In an embodiment, the aliphatic alcohol may be, for example, and without limitation, methanol, ethanol, 1-propanol, isopropanol, butanol or octanol.

In an embodiment, the aqueous acid may be, for example, and without limitation, aqueous hydrochloric acid or phosphoric acid. In an embodiment, the aqueous acid may be, for example, and without limitation, aqueous hydrochloric acid. In an embodiment, the aqueous acid may be, for example, and without limitation, aqueous phosphoric acid.

In an embodiment, the method may further comprise, for example, and without limitation, isolating and/or purifying the polymer before application on the substrate. In an embodiment, the polymer may be, for example, and without limitation, isolated by precipitation by centrifugation. In an embodiment, the polymer may be, for example, and without limitation, isolated by centrifugation with HCl. In an embodiment, the polymer may be, for example, and without limitation, purified to remove excess reactants and byproducts using HCl. In an embodiment, the polymer may be, for example, and without limitation, isolated by centrifugation with phosphoric acid. In an embodiment, the polymer may be, for example, and without limitation, purified to remove excess reactants and byproducts using phosphoric acid. In an embodiment, the polymer may be, for example, and without limitation, isolated with an anion. In an embodiment, the anion may be from, for example, and without limitation, formic acid, acetic acid, phosphoric acid, p-toluenesulfonic acid, sodium dodecyl sulfate or sodium dodecyl benzene sulfonate. In an embodiment, the method may further comprise, for example, and without limitation, dispersing the polymer in a solvent. In an embodiment, the solvent in which the polymer is dispersed may or may not be the same solvent used during the polymerization step. In an embodiment, the solvent may comprise, for example, and without limitation, an acid. In an embodiment, the solvent may comprise, for example, and without limitation, a compound having a phosphate moiety. In an embodiment, the solvent may comprise, for example, and without limitation, aqueous phosphoric acid. In an embodiment, the phosphoric acid may be, for example, and without limitation, 0.04 M, 0.08 M or 0.12 M phosphoric acid. In an embodiment, the solvent may be, for example, and without limitation, a coordinating solvent (i.e., a solvent containing an OH). In an embodiment, the solvent may be, for example, and without limitation, water, methanol, ethanol, 1-propanol, acetonitrile, THF or toluene. In an embodiment, the solvent may comprise, for example, and without limitation, methanol and phosphoric acid.

Suitable application methods would be understood to and can be determined by those of ordinary skill in the art. In an embodiment, the anticorrosive composition or polymer may be, for example, and without limitation, applied by direct application, spray coating or electrocoating. In an embodiment, the anticorrosive composition or polymer may be, for example, and without limitation, applied by electrocoating of a soluble form of the polymer or the nanoparticles of the polymer from solution. In an embodiment, the anticorrosive composition or polymer may be, for example, and without limitation, applied by electrocoating of a soluble form of poly(anilineboronic acid) (PABA) or the nanoparticles of poly(anilineboronic acid) from solution. In an embodiment, the anticorrosive composition or polymer may be, for example, and without limitation, applied on the substrate by electrophoretic deposition using a dispersion of the polymer nanostructures. In an embodiment, the anticorrosive composition or polymer may be, for example, and without limitation, applied in the form of a coating or a film.

In an embodiment, the method may further comprise, for example, and without limitation, heat treating the applied anticorrosive composition or polymer. In an embodiment, the applied anticorrosive composition or polymer may be, for example, and without limitation, heat treated at a temperature of 120° C. In an embodiment, the applied anticorrosive composition or polymer may be, for example, and without limitation, heated treated under vacuum.

The substrate is not particularly limited and suitable substrates would be understood to and can be determined by those of ordinary skill in the art. In an embodiment, the substrate may be, for example, and without limitation, a steel substrate.

In an embodiment, there is provided an anticorrosive composition produced by the method as described anywhere herein. In an embodiment, the anticorrosive composition may comprise, for example, and without limitation, the polymer as described anywhere herein. In an embodiment, the anticorrosive composition may be, for example, and without limitation, for a substrate. In an embodiment, there is provided a substrate protected with an anticorrosive composition produced by the method as described anywhere herein. In an embodiment, the substrate may be, for example, and without limitation, the substrate as described anywhere herein.

In an embodiment, there is provided an anticorrosive polymer produced by the method as described anywhere herein. In an embodiment, the anticorrosive polymer may be, for example, and without limitation, for a substrate. In an embodiment, there is provided a substrate protected with an anticorrosive polymer produced by the method as described anywhere herein. In an embodiment, the substrate may be, for example, and without limitation, the substrate as described anywhere herein.

In an embodiment, the anticorrosive polymer may be, for example, and without limitation, the polymer having a boron-phosphate complex containing fluoride as described anywhere herein. In an embodiment, the anticorrosive polymer may be, for example, and without limitation, a boronic acid substituted polyaniline i.e., poly(anilineboronic acid) (PABA).

In an embodiment, the anticorrosive polymer may be, for example, and without limitation, a self-doped polymer. In an embodiment, the anticorrosive polymer may be, for example, and without limitation, a conducting polymer. In an embodiment, the anticorrosive polymer may be, for example, and without limitation, water soluble. In an embodiment, the anticorrosive polymer may be, for example, and without limitation, a cross-linked polymer.

Various alternative embodiments and examples of the invention are described herein. These embodiments and examples are illustrative and should not be construed as limiting the scope of the invention.

EXAMPLES

Example 1

PABA/Phosphate Dispersions

Materials. 3-Aminophenylboronic acid hydrochloride salt (3-APBA) and ammonium persulfate were purchased from Aldrich Chemical Inc. Sodium fluoride, potassium chloride, sodium phosphate and phosphoric acid (85%) were purchased from Fisher Scientific. Bulk distilled water was filtered then ion exchanged to yield 18.2 MΩ.cm quality water using Milli-Q-Academic A10 (Millipore Corporation). Indium-doped tin oxide coated glass slides (ITO, 6±2 Ω/square) were purchased from Delta Technologies Ltd. Gold interdigitated array microelectrodes (IDAs) were obtained from Biomedical Microsensors Laboratory at North Carolina State University. Each of these arrays contained 2.8 mm×0.075 mm gold electrodes with a gap width of 20 μm that had a total exposed area of 0.069 mm² TEM formvar-carbon coated copper grids (400 mesh) were purchased from CANEMCO-MARIVAC.

Synthesis of PABA/phosphate dispersions. PABA dispersions were synthesized using 10 mM (3-APBA) (monomer) and 50 mM sodium fluoride in 0.1 M phosphoric acid (20 mL) by adding 5 mM ammonium persulfate (oxidizing agent). Polymerization of 3-APBA was not observed in the absence of fluoride. A minimum of one molar equivalent of fluoride to monomer was required to obtain conducting PABA with >50% yields. The mixture was stirred at room temperature and the reaction was allowed to proceed for 16 h. In phosphoric acid, PABA was well suspended under the polymerization conditions. As a result, PABA was isolated via centrifugation and subsequently purified (to remove excess reactants and byproducts) using 0.1 M phosphoric acid. Finally, the polymer was re-dispersed in 0.1 M phosphoric acid without fluoride. The dispersion of PABA nanostructures prepared in 0.1 M phosphoric acid is stable indefinitely (no settling was observed over a two month period) with a maximum concentration of 5 mg/mL. PABA dispersions can be prepared in concentrations up to 20 mg/ml, however they do not remain suspended indefinitely. The dispersion of nanostructures was coated on gold IDAs and ITO electrodes for electrochemical and spectroscopic characterization.

Characterization. The morphology of the PABA dispersion was examined by transmission electron microscopy (TEM, JEOL JEM-2000FX). TEM samples were prepared by diluting the purified product and casting the dispersion onto copper grids. UV-vis absorption spectra of PABA dispersions were obtained using an Agilent 8453 spectrophotometer. Fourier Transform-Infrared (FT-IR) spectra were obtained using a Nexus™ 870 spectrometer (Thermo Nicolet Corporation) equipped with an attenuated total reflectance (ATR) accessory. FTIR-ATR spectra of dry PABA powders were collected using a hemispherical germanium optical crystal and a deuterated triglycine sulfate and thermo-electrically cooled (DTGS TEC) detector. 32 interferograms were accumulated to obtain each FTIR-ATR spectrum at a spectral resolution of 8 cm$^{-1}$. Cyclic voltammetric and potential dependence drain current ($I_D$-$V_G$ characteristic) measurements were performed using a CH Instrument CHI 760 electrochemical workstation. For both measurements, a three electrode configuration was used including a Pt wire counter electrode, Ag/AgCl as a reference electrode, and gold IDA as a working electrode. The potentials were scanned from negative to positive directions. $I_D$-$V_G$ characteristics were obtained by cycling the potential of the two adjacent PABA-coated microelectrodes (connected to W1 and W2 working electrode terminals of the bipotentiostat) maintaining a 50 mV potential difference between them. $^{11}$B NMR studies were carried out using a Bruker AMX 500 NMR spectrometer. The samples were prepared by adding 10% $D_2O$ in the monomer and polymer solution in 0.1 M phosphoric acid. Chemical shifts were determined relative to borontrifluoride etherate as a reference. X-ray photoelectron spectroscopic (XPS) analyses were carried out using Kratos Axis Ultra spectrometer with a base pressure of 2×10$^{-10}$ mbar (UHV). A monochromatized Al Kα radiation source (hv=1486.70 eV) was used. The x-ray electron gun was operated at 15 kV and 20 mA. The kinetic energy of the photoelectrons was analyzed in a multichannel delay-line detector (DLD).[31] Survey and high-resolution spectra were collected using 160 and 40 eV pass energies, respectively. The analyzed area of the samples was 700×300 μm². Spectra were acquired with electron charge compensation in operation to avoid sample charging. The binding energy scale was referenced to the C 1s peak of PABA, which was set to 284.6 eV. Core peaks were analyzed using a nonlinear Shirley-type background and peak positions and areas were obtained by weighted least-squares fitting of model curves (70% Gaussian, 30% Lorentzian) to the experimental data. Based on the best practice of fitting the data for PABA, the maximum values of the FWHM were assigned for every single element, which were maintained equal during the component fit. The positions of component peaks were optimized to give the best fit to the experimental spectrum. The surface elemental compositions were determined by the ratios of peak areas corrected with sensitivity provided by Kratos for the Axis Ultra analyzer.[32]

Results and Discussion

The polymerization of 3-APBA in the presence of fluoride and phosphoric acid results in a stable PABA dispersion. The obtaining of PABA dispersions consisting of 2-15 nm particle sizes using 0.1 M HCl and fluoride has been reported, however they only remained suspended for 1 day.[28] In contrast, the larger size PABA particle dispersions prepared in the presence of phosphoric acid and fluoride are stable indefinitely; no settling was observed over a two month period at a concentration of 5 mg/mL. These results suggest that the stability of the dispersions in phosphoric acid relative to hydrochloric acid is due to the interaction of the phosphate with the boronic acid substituent.

In order to explore this chemistry in more detail, an XPS study was performed on PABA film prepared from dispersions and rinsed with water. PABA dispersion was prepared in 0.1 M phosphoric acid and fluoride and then it was purified and re-dispersed in the 0.1 M phosphoric acid without fluoride. The percentages of neutral nitrogen, positively charged nitrogen, B:F and B:P ratios in the PABA film are shown in Table 1.

TABLE 1

N1s composition and boron to dopant ratios in PABA/phosphate film prepared from dispersion.

| | |
|---|---|
| % N | 71 |
| % N$^+$ | 29 |
| B:N | 1:1 |
| B:F | 1:0.4 |
| B:P | 1:2 |

The neutral nitrogen is the sum of the two lowest binding energy components within the N1s envelope, and are attributed to the quinoid imine (—N=, ~398.1 eV) and benzenoid amine (—NH—, ~399.5 eV). The doping level of the polymer can be determined quantitatively based on the amount of dopant and the positively charged nitrogen (N$^+$, >400 eV) by deconvoluting the N 1s core-level spectrum.[33,34] Generally, in externally doped PANI with HCl, H$_2$SO$_4$ etc., the percentage of dopant and positively charged nitrogen is approximately same.[33,34] In PABA, the percentage of fluoride dopant is approximately the same as the positively charged nitrogen, however, the percentage of phosphate is in excess (see Table 1). Without being bound by theory, it is believed that these results suggest that the PABA prepared in the presence of phosphoric acid and fluoride involves the complexation of boron to phosphate and fluoride. Based on the B:P ratio, all borons in polymer are bound to two phosphate groups. However, the fluoride is associated with approximately 40% of the total polymer.

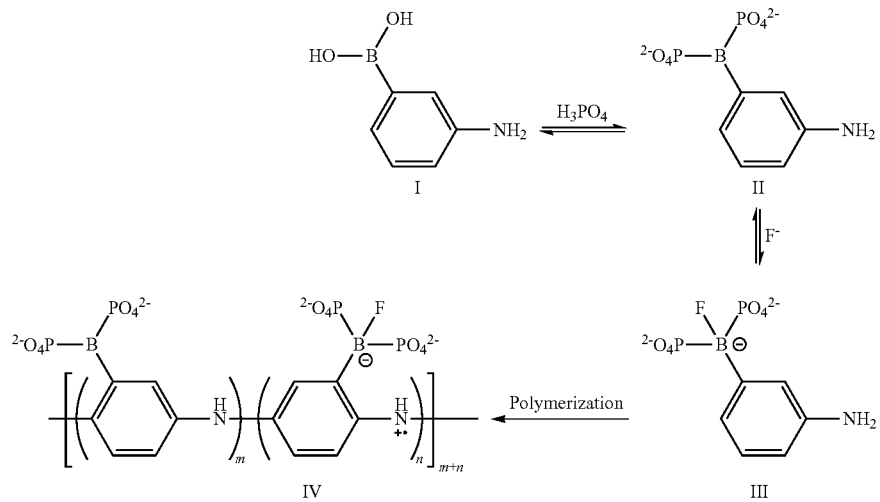

Scheme 1. Proposed mechanism of 3-APBA-phosphate complexation and polymerization.

The chemical structure of PABA was further studied with $^{11}$B NMR by examining of both monomer and polymer solutions in phosphoric acid as shown in FIG. 1. The chemical shift of the $^{11}$B NMR signal of boronic acids is dependent on the hybridization state of the boron atom (trigonal versus tetrahedral). The $^{11}$B NMR spectrum of the monomer in phosphoric acid (FIG. 1a) shows a single resonance with a chemical shift of 28.8 ppm indicating that boron exists primarily in the neutral trigonal form (Scheme 1, 11).[35] However, in the presence of sodium fluoride (FIG. 1b), a resonance signal is observed approximately 25 ppm upfield indicative of the formation of tetrahedral anionic boronate (Scheme 1, III)[24,25] Following the addition of an oxidizing agent, completion of the polymerization reaction, purification and re-dispersion in 0.1 M phosphoric acid without fluoride, the $^{11}$B NMR spectrum was taken again (FIG. 1c). The spectrum shows that the boron exists in both trigonal boronic acid and tetrahedral anionic boronate form (Scheme 1, IV). The amount of tetrahedral boronate is approximately 35%. These results suggest that in monomer solution, fluoride stabilizes tetrahedral boron (Scheme 1, III) which in turn allows oxidation of the monomer. Once the polymer is formed and oxidized, the oxidized backbone stabilizes the boron-phosphate complexation. The existence of multiple peaks in the PABA nanoparticle dispersion suggest that there are both tetrahedral and trigonal forms of boron which do not interconvert on the NMR timescale[36,37] as indicated by the peaks at 3.68 and 28.40 respectively as well as some fraction of boron groups which experience fast interconversion resulting in an averaged peak position[36,37] of 19.40 ppm. The percentage of tetrahedral boronate is in agreement with the percentage of positively charged nitrogen obtained from XPS study and suggests that the PABA is self-doped in phosphoric acid in the presence of fluoride and self-stabilized likely due to the formation of boron-phosphate complex. Based on both XPS and $^{11}$B NMR results, the structure of self-doped PABA is composed of around 40% n and 60% m repeat units as shown in Scheme 1 IV. PABA/phosphate dispersions were prepared by varying monomer to oxidant ratios from 1:0.25 to 1:2. The stability of PABA particle dispersion with time as well as the redox conductivity as a function of pH was found to be higher at monomer to oxidant ratios of 1:0.5 due to the higher degree of self-doping at the optimum polymerization rate.

Figure 2:
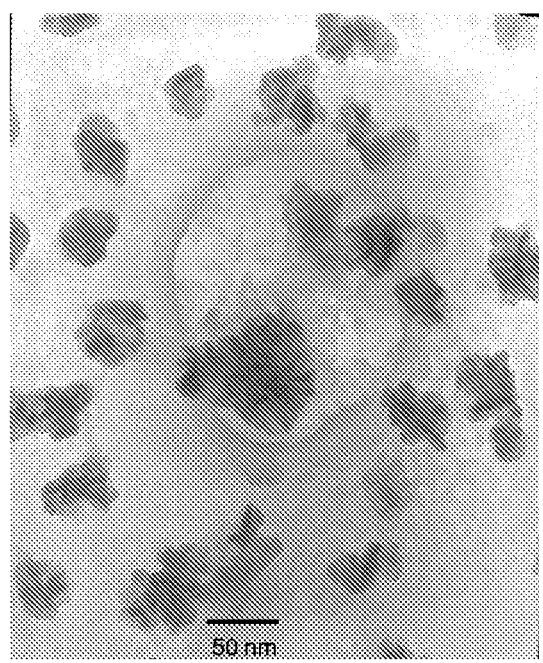
FIG. 2 depicts a TEM micrograph of PABA/phosphate particles.

FIG. 2 presents the TEM image of a PABA dispersion prepared in 0.1 M phosphoric acid and fluoride. The PABA dispersion was purified and re-dispersed in the 0.1 M phosphoric acid without fluoride. The morphology of PABA prepared in 0.1 M phosphoric acid and fluoride is somewhat similar to that obtained in 0.1 M HCl and fluoride. In 0.1 M HCl solution and fluoride, spherical nanoparticles with diameter in the range of 2-15 nm are obtained.[28] However, phosphate doped and complexed PABA produces irregular shape particles with size range 25-50 nm (FIG. 2). The difference observed in the size and shape of PABA prepared in phosphoric acid can be attributed to the boron-phosphate complexation.

Figure 3:
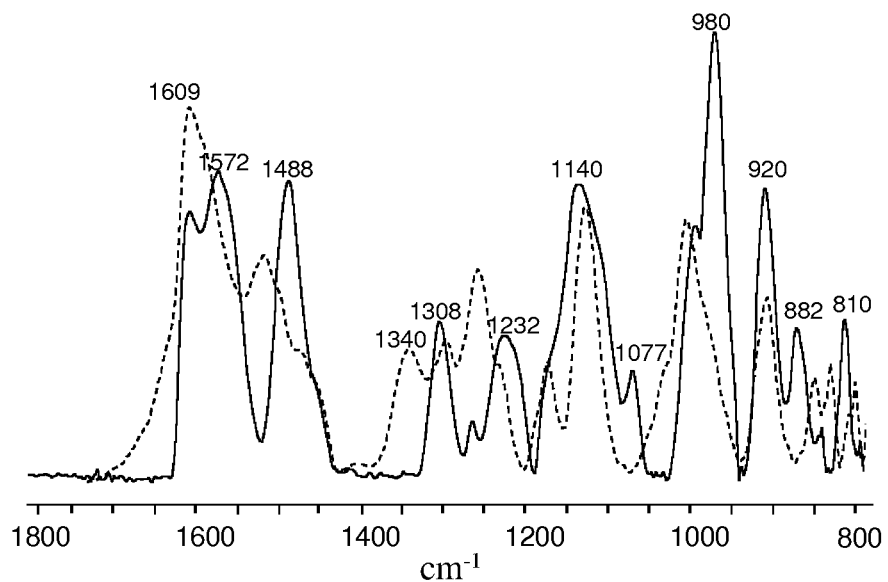
FIG. 3 depicts a FTIR-ATR spectrum of PABA/phosphate dried powder (solid line) and PABA prepared chemically using 0.5 M HCl in the presence of fluoride (dashed line)

The FTIR-ATR spectrum of PABA/phosphate nanostructures depicts all of the characteristic bands of PANI and boron-phosphate interactions as shown in FIG. 3 solid line. IR bands characteristic of PANI are observed at 1609, 1488, and 1140 cm$^{-1}$ corresponding to quinoid, benzenoid and the aromatic C—N stretching ring modes.[38] The characteristic bands of the B—F stretching modes are observed at 810, 850 and 882 CM$^{-1}$.[39] However, the asymmetric B—O stretching mode generally observed at 1340 cm$^{-1}$ in boronic acids, as shown in FIG. 3 dashed line, is not present in PABA/phosphate. Bands characteristic of phosphate are observed at 920, 980, 1077, 1232, 1308 cm$^{-1}$.[39] The appearance of a sharp peak at 1572 cm$^{-1}$ is attributed to the B—N dative bond.[40,41] However, this peak is not observed for PABA synthesized chemically without phosphate (FIG. 3 dashed line).[27,42] Therefore, the presence of the peak at 1572 cm$^{-1}$ and absence of B—O stretching mode further supports that the other interactions such as boron-phosphate likely contribute to this peak as shown in Scheme 1 IV.

Figure 4:
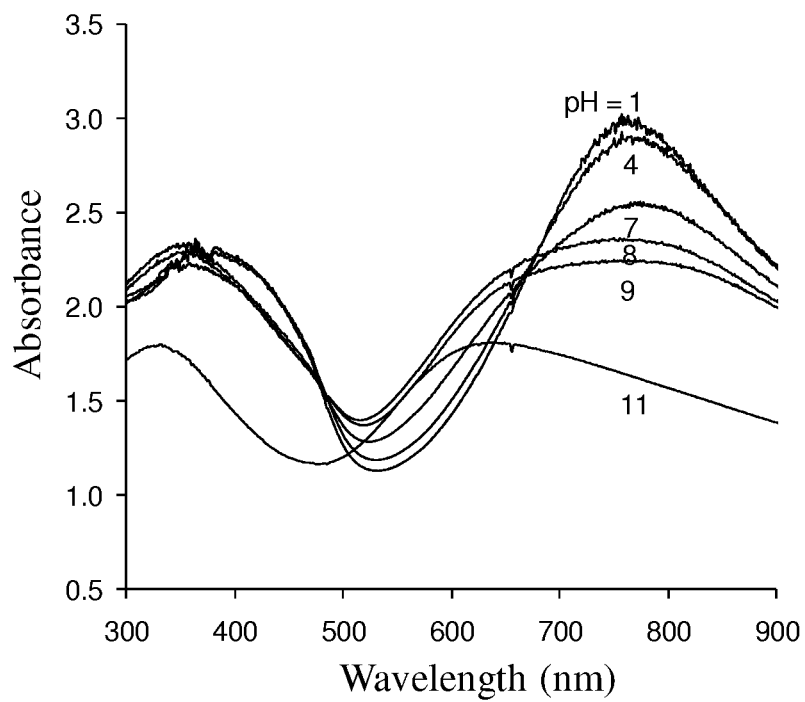
FIG. 4 depicts UV-vis spectra of PABA/phosphate dispersion as a function of pH.
Figure 5:
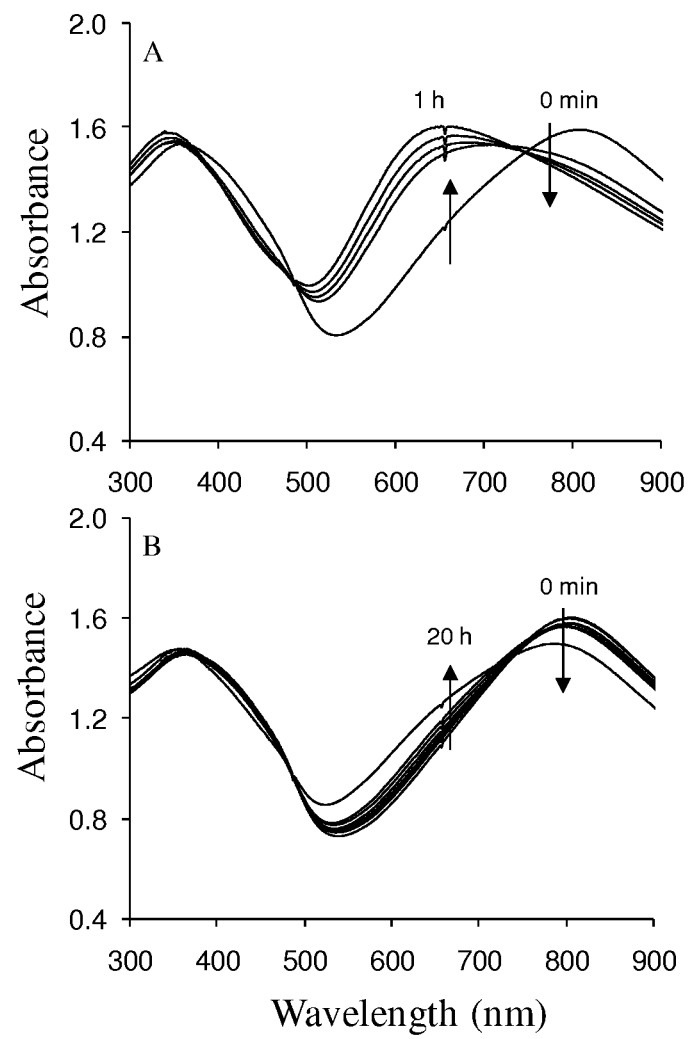
FIG. 5 depicts UV-vis spectra of PABA/phosphate in (A) phosphate buffered saline (with NaCl) and (B) phosphate solution (without NaCl) at pH 7.4 as a function of time.

The above spectroscopic results confirm the boron-phosphate interaction and formation of self-doped PABA. To further explore the role of phosphate, optical, electrochemical and in situ conductivity properties of PABA as a function of pH have been studied. FIG. 4 shows the UV-vis spectra of PABA dispersion as a function of pH. PABA dispersed in 0.1 M phosphoric acid resulted in a pH of 1, and the pH of the dispersion was subsequently increased by titrating with 1 M NaOH. The characteristic absorption bands around 320 and 800 nm assigned to π-π* and bipolaron band transitions, respectively, are observed up to pH 7.[43,44] The existence of these bands in the PABA dispersion indicates that the polymer is in the conducting emeraldine salt state up to pH 7. At pH values 8 and 9, the bipolaron band remained at 700-800 nm, however, it broadens and exhibits a slight blue shift. At a pH value of 11, the presence of a broad peak at 620 nm suggests the complete dedoping of PABA to the emeraldine base form of the polymer. The PABA dispersion was stable and remained green up to pH 9. Above pH 9, the nanoparticles undergo a color change from green to blue consistent with dedoping, as well as flocculation. The flocculation of nanoparticles results in a decrease in absorbance at pH 11 due to scattering. The dedoping of polymer obtained upon exposure to alkaline pH is likely due to removal of phosphate and fluoride and conversion from emeraldine salt to the base form.[26] In order to verify these results, the stability of PABA dispersion in pH 7.4 phosphate buffer with and without NaCl was examined as a function of time (FIG. 5). The conversion of the dispersion from emeraldine salt to the base form of PABA is observed at pH 7.4 in the presence of phosphate buffered saline (containing NaCl) solution as shown in FIG. 5A. In contrast, the PABA dispersion is highly stable in pH 7.4 phosphate buffered solution (in the absence of NaCl) as a function time (FIG. 5B). These results suggest that boron forms an anionic tetrahedral boronate group in the presence of phosphate and fluoride resulting in self-doping, and imparts conductivity stability of PABA dispersion as a function of pH. The exchange of phosphate with other anions such as chloride or hydroxide results in the dedoping of the PABA dispersion.

Figure 6:
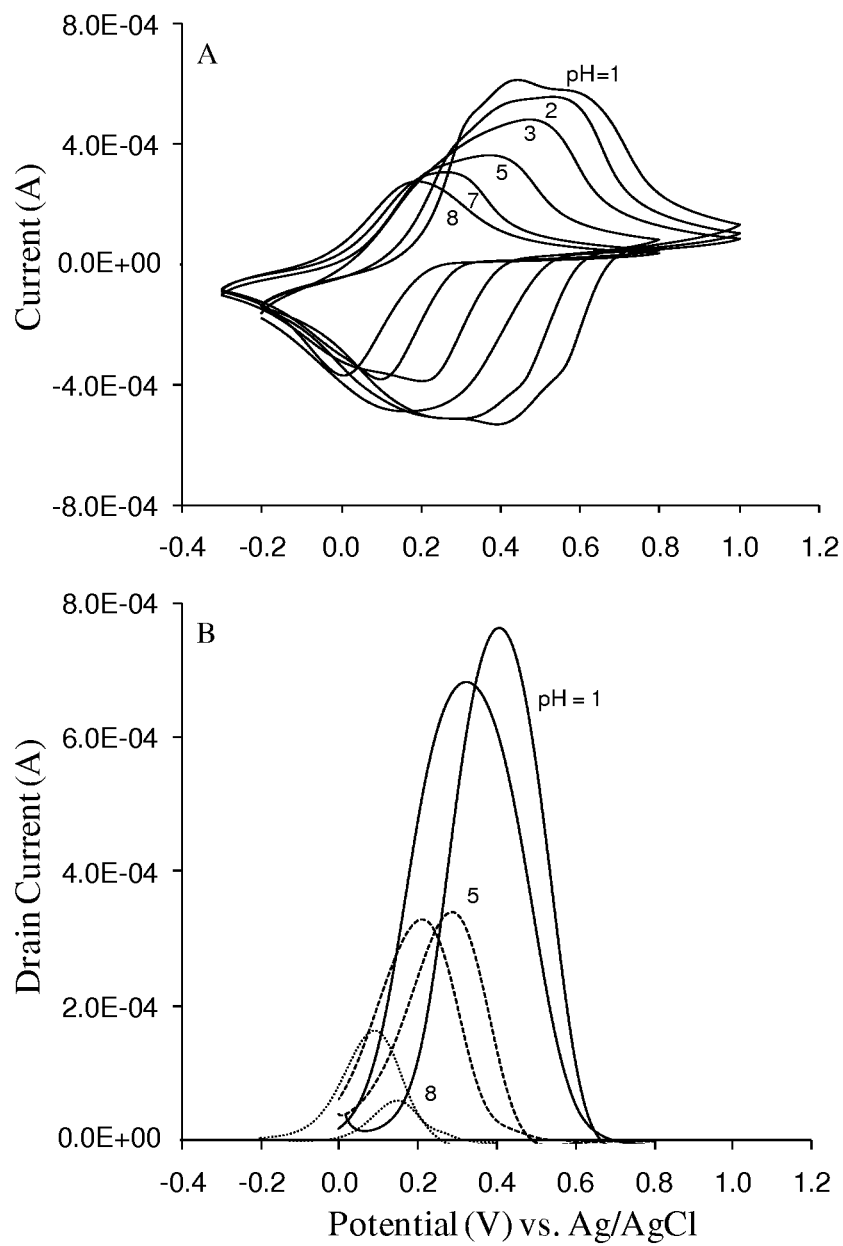
FIG. 6 depicts cyclic voltammograms at 100 mV/s (A) and $I_D$-$V_G$ characteristics at 5 mV/s (B) of PABA/phosphate coated IDA's as a function of pH of solution. The electrolyte pH solutions in the range of 1-8 are prepared using 0.5 M phosphoric acid and sodium bihydrogen phosphate.

FIG. 6 shows the pH dependant redox and in situ conductivity behavior of a PABA dispersion coated onto an IDA. The cyclic voltammograms of PABA in the pH range 1-8 shown in FIG. 6A suggest that PABA is redox active at neutral and above neutral pH. The oxidation and reductions peaks are dependent upon the pH of electrolyte solution. At pH 1-3, the presence of two sets of redox peaks are attributed to the facile conversion between oxidation states similar to unsubstituted PANI[45] and previously reported for chemically and electrochemically prepared PABA under acidic conditions in the presence of fluoride.[26,46,47] However, above pH 3, only one set of redox peaks is observed, suggesting that the emeraldine form is not stable in this pH range and that PABA is directly converted from the fully reduced leucoemeraldine to highly oxidized pernigraniline form. This pH dependant redox behavior is consistent with self-doped PABA in the presence of D-fructose,[48] sulfonated self-doped PANI[49] and PANI doped with phosphoric acid with long and short hydrophilic ethylene glycol segment.[22] Similar to these reports, the magnitude of peak current decreases as a function of pH of solution. However, the decrease in current observed for PABA in the pH range of 1-8 is far less than the reported one order decrease for sulfonated self-doped PANI[49] and the two order decrease for PANI doped with phosphoric acid with long and short hydrophilic ethylene glycol segment.[22] The cyclic voltammograms of PABA are reproducible and reversible in pH range 1-8. These results suggest that self-doped PABA, involving an anionic tetrahedral boronate in the presence of phosphate and fluoride is stable even in the absence of fluoride in electrolyte solution and during cycling and thus extending the electroactivity of PABA to neutral and above neutral pH.

FIG. 6B shows the $I_D$-$V_G$ characteristic of PABA in a potential range 0.0 to 0.8 V as a function of solution pH. Throughout the entire pH range, $I_D$-$V_G$ characteristics of PABA are reproducible from scan to scan. The $I_D$-$V_G$ characteristics show that the potential window of high conductivity is pH dependant similar to the redox behavior. Also, the width of conducting region is narrowed from 0.6 to 0.4 V for pH 1 to 8. The conductivity was calculated from the ohmic current flowing through the film via two working electrodes using formula a σ=$i_\Omega$/EA S/cm, where $i_\Omega$ is the ohmic current, E is the voltage offset between the electrodes divided by the distance between them and A is the total effective cross-sectional area between the two arrays of electrodes.[50] The cross-sectional area is determined by the thickness of the film (0.3 μm) and their total length (7.84 cm) leading to A=2.35× $10^{-4}$ $cm^2$. The thickness of the film was calculated using the mass of the PABA, density and electrode area. The measured spacing between the electrodes was 20 μm and offset voltage between the electrodes of 50 mV. The conductivity of PABA reaches a maximum at a potential intermediate between the two states of being insulating fully reduced leucoemeraldine and fully oxidized pernigraniline form. At pH 1, the maximum conductivity of PABA is 0.14 S/cm at 0.4 V. The conductivity value decreased to 0.07 S/cm at 0.25 V and 0.03 S/cm at 0.1 V for pH 5 and 8, respectively. However, in the case of PANI, the reported maximum conductivity decreases almost 2 orders of magnitude from pH 0 to 4.[51]

The PABA dispersions prepared in phosphoric acid in the presence of fluoride involves boron-phosphate interactions and formation of an anionic tetrahedral boronate group, which forms the basis of self-doped PABA. Poly(anilineboronic acid)/phosphate nanoparticle dispersions are produced in high yields using the reactivity of the boronic acid moiety with phosphate in the presence of fluoride. According to $^{11}B$ NMR studies, the formation of anionic tetrahedral boronate group in phosphoric acid in the presence of fluoride forms the basis of self-doped, stabilized PABA nanoparticle dispersion. The poly(anilineboronic acid)/phosphate nanoparticle dispersions as described herein provide a substantial advantage of high stability. The highly conducting PABA dispersion with 25 to 50 nm size particles can be prepared without using surfactants or stabilizers as a template. UV-vis, FT-IR-ATR spectroscopic and cyclic voltammetric results confirm the formation of the conducting form of PABA. Due to self-doping, PABA dispersions have high electroactive and conducting stability in neutral and above neutral pH conditions. Films produced from these particles exhibit enhanced redox stability and potential dependant conductivity under neutral and basic pH conditions due to the formation of a boron-phosphate complex containing fluoride, which results in a self-doped form of the polymer. As a result, this material is an excellent candidate for pH, $CO_2$ and bio-sensors as well as for formulations for coatings and ink-jet printing. For example, this material is an excellent candidate as an anticorrosive coating or film.

Example 2

Poly(Anilineboronic Acid)-Based Anticorrosive

Materials. 3-Aminophenylboronic acid hydrochloride salt (3-APBA), Sure/Seal™ anhydrous methanol and 1-propanol, and ammonium persulfate were purchased from Aldrich Chemical Inc. Sodium fluoride was purchased from Fisher Scientific. Anhydrous ethanol was purchased from Commercial Alcohols Inc. Bulk distilled water was filtered then ion exchanged to yield 18.2 MΩ.cm quality water using Milli-Q-Academic A10 (Millipore Corporation).

Figure 7:
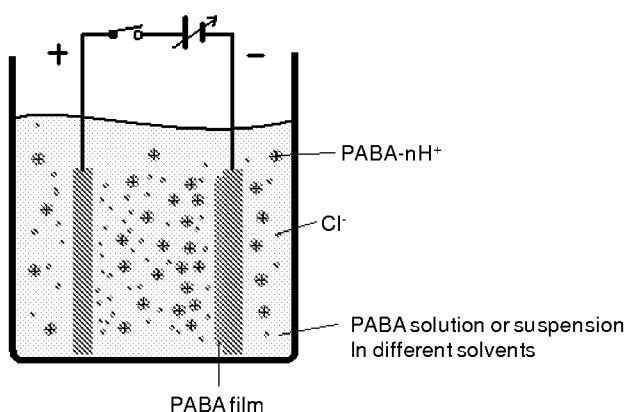
FIG. 7 depicts a schematic illustration of the setup used for the electrophoretic deposition of PABA from its solution or colloidal suspension. A steel plate was used as the working electrode to deposit film and counter electrode. The size of the electrodes is 2.6 cm×1.3 cm, the electrode separation is 4 mm.
Figure 8:
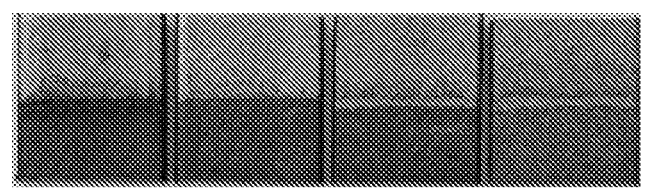
FIG. 8 depicts photographs of PABA coated steel plate. Films electrophoretically deposited from PABA solution in methanol (1 mg/ml) at different potential for 300 s.
Figure 9:
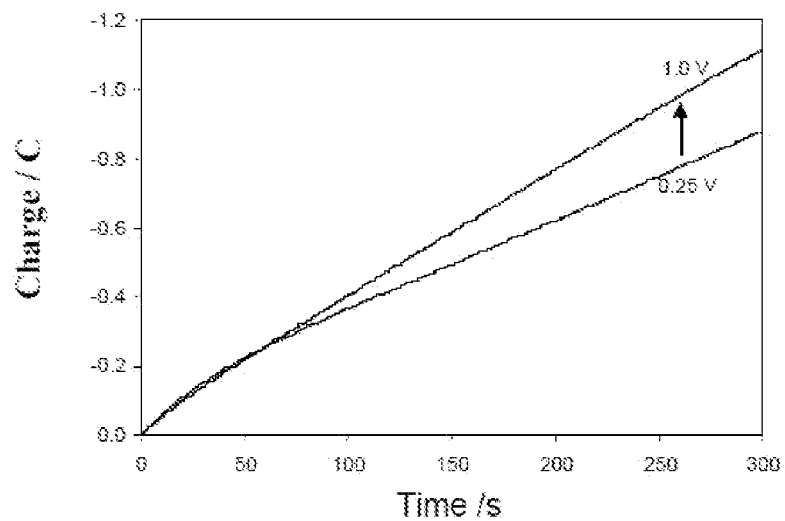
FIG. 9 depicts charge of PABA films electrophoretically deposited on steel plate from methanol solution (1 mg/ml) at different potential for 300 s.
Figure 10:
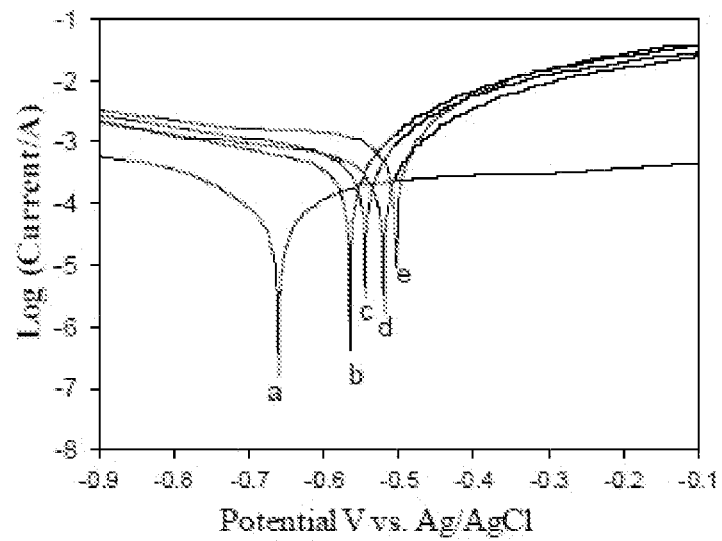
FIG. 10 depicts Tafel plots of PABA coated steel plate in 3% NaCl; (a) blank steel plate and PABA in methanol (1 mg/ml) at (b) 0.25 V (c) 0.50 V, (d) 0.75 V and (e) 1.0 V for 300 s.
Figure 11:
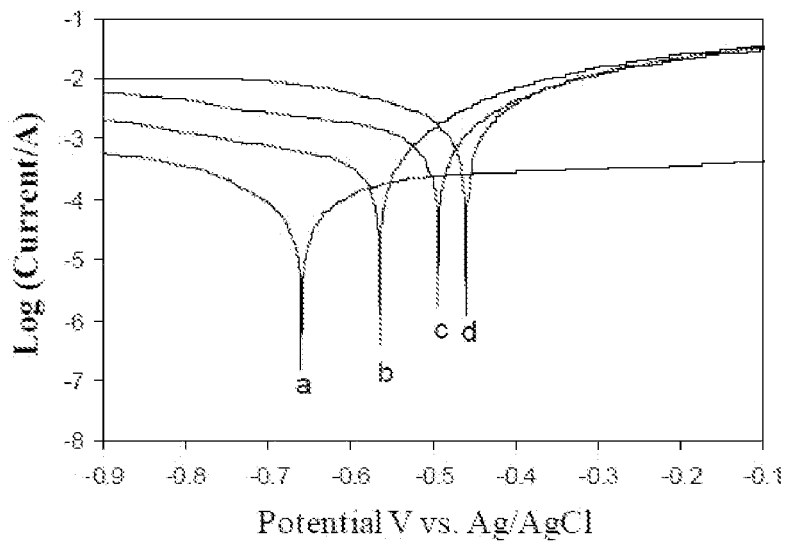
FIG. 11 depicts Tafel plots of PABA coated steel plate in 3% NaCl; (a) blank steel plate and films prepared from PABA in methanol (1 mg/ml) at 0.25 V for (b) 300 s, (c) 900 s and (d) 1800 s.
Figure 12:
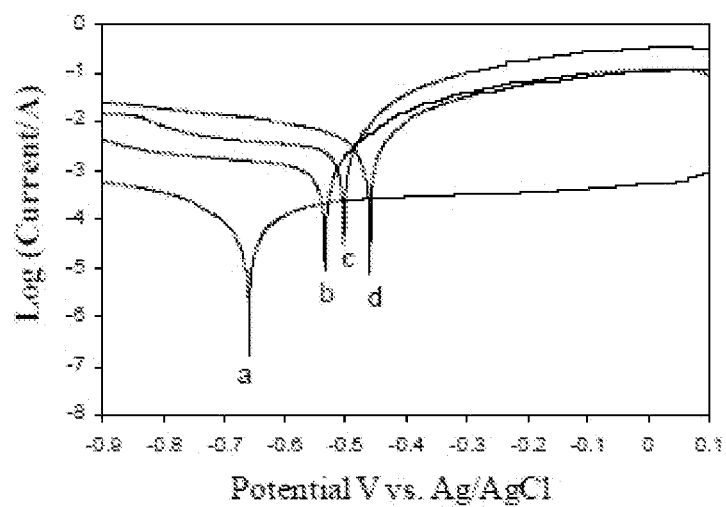
FIG. 12 depicts Tafel plots of PABA coated steel plate in 3% NaCl; (a) blank steel plate and films prepared from 1 mg/ml PABA in (b) ethanol (2 V), (c) 1-propanol (4 V), and (d) acetonitrile (0.25 V). Films were deposited at same charge using 1 mg/ml PABA.
Figure 13:
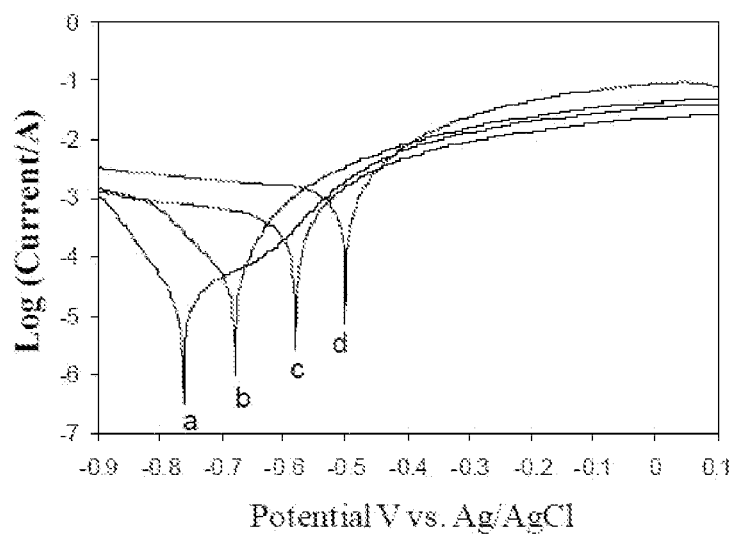
FIG. 13 depicts Tafel plots of PABA coated polished steel plate in 3% NaCl; (a) blank steel plate and films prepared from PABA in1-propanol (1 mg/ml) at (b) 2 V, (c) 4 V and (d) 8 V for 900 s.
Figure 14:
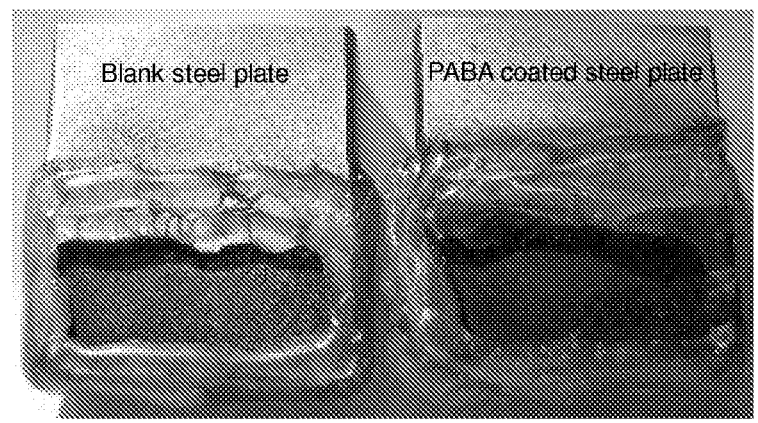
FIG. 14 depicts photographs of blank steel plate (left) and PABA coated steel plate (right) soaked in 3% NaCl for 20 h. Film electrophoretically deposited from PABA solution in 1-propanol (1 mg/ml) at 4 V for 900 s.

Polymerization. PABA nanostructures were synthesized using 10 mM (3-APBA) (monomer) and 50 mM sodium fluoride in anhydrous alcohols (methanol, ethanol and 1-propanol) by adding 10 mM ammonium persulfate (oxidizing agent). Monomer with sodium fluoride and oxidizing agent were ground separately using mortar and pestle, and then oxidizing agent (ground powder) was added at once into the solution containing monomer and sodium fluoride. Polymerization of 3-APBA was not observed in the absence of fluoride. The minimum one equivalent of fluoride to monomer was required to obtain PABA. The mixture was stirred at room temperature and reaction was carried out for different time intervals in different solvents. In anhydrous alcohols, PABA was soluble under polymerization condition. Therefore, the PABA obtained was isolated via precipitation by adding the 0.5 M HCl and centrifugation followed by purification (to remove excess reactants and byproducts) using the 0.5 M HCl. Finally, nanostructures were rinsed with the corresponding solvents used during polymerization to remove traces of water and then re-dispersed in the same solvent. After removal of traces of water, the nanostructures are easily re-dispersed into the solvent. The dispersion of PABA nanostructures prepared in alcohols are stable indefinitely (no settling was observed over a six month period) with maximum concentration of 5 mg/mL. The electrophoretic depositions on type 304 Stainless Steel samples were carried out using dispersions of nanostructures. A schematic illustration of the setup used for the electrophoretic deposition is shown in FIG. 7.

Characterization. Electrophoretic deposition, pontentiodynamic polarization and open-circuit potentials measurements were performed using a CH Instrument CHI 660 workstation. In the pontentiodynamic polarization experiments, a three electrode configuration was used including a Pt wire counter electrode, Ag/AgCl as a reference electrode, and PABA coated steel sample as a working electrode. Open-circuit potentials measurements were carried out using a two electrode configuration consist of Ag/AgCl as a reference electrode and PABA coated steel sample as a working electrode. Microscopic measurements were also conducted.

Results and Discussion

TABLE 2

Effect of solvents used for electrophoretic deposition of PABA:

| PABA prepared and dispersed in | Dispersion and deposition |
| --- | --- |
| Methanol | Good dispersion in all the solvents |
| Ethanol | PABA films prepared electrophoretically |
| 1-propanol | from these dispersions have shown good |
| *Acetonitrile | adherence on steel plates |
| Methanol + phosphoric acid | PABA films have shown good resistance to corrosion in 3% NaCl solution For results see FIGS. 8-16 |
| *THF | In THF and toluene PABA was not well |
| *Toluene | dispersed so electrophoretic deposition was not possible |

*PABA prepared in methanol and dispersed in these solvents.

TABLE 3

Optimization of parameters for electrophoretic deposition of PABA:

| Parameters | Results |
| --- | --- |
| Applied potential Deposition time Amount of PABA | PABA film thickness increased with increase in applied potential, deposition time and the amount of PABA. |
| Amount of phosphoric acid | Thick PABA films were highly resistant to corrosion in 3% NaCl solution. Similar results were obtained with increase in the amount of phosphoric acid. For results see FIGS. 8-16 |

Figure 15:
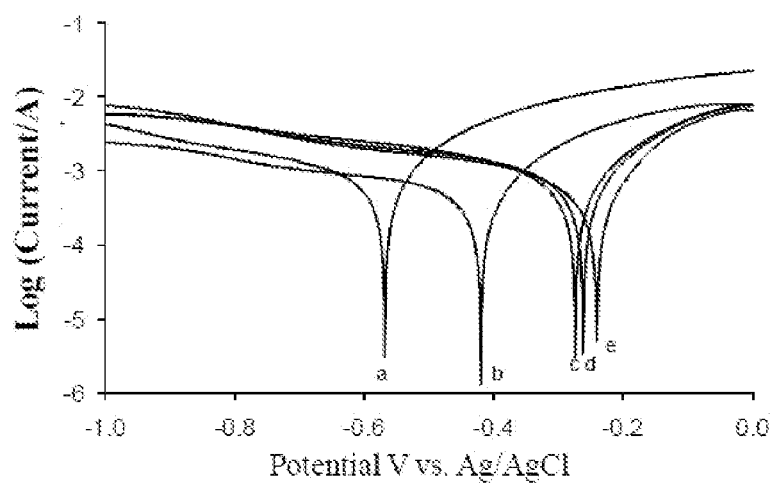
FIG. 15 depicts Tafel plots of PABA coated steel plate in 3% NaCl; (a) blank steel plate, (b) film prepared from PABA in methanol (1 mg/ml)+0.12 M phosphoric acid, (c-e) film prepared from PABA in methanol (1 mg/ml) with different amount of phosphoric acid and heated at 120° C. under vacuum. Phosphoric acid in (c) 0.04 M, (d) 0.08 M and (e) 0.12M.
Figure 16:
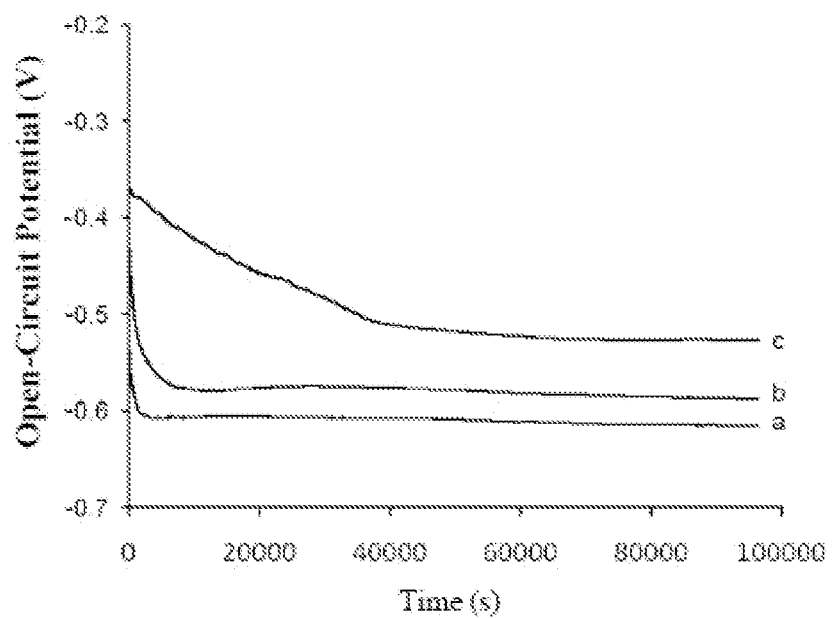
FIG. 16 depicts open-circuit potential of PABA coated steel plate in 3% NaCl; (a) blank steel plate and film prepared from PABA in methanol (1 mg/ml)+0.12 M phosphoric acid without (b) and with (c) heating at 120° C. under vacuum.

Effect of Temperature on PABA Films Coated on Steel Samples:

Pontentiodynamic polarization and open-circuit potentials measurements of PABA film coated steel samples with and without heat treatment are shown in FIGS. 15 and 16, respectively. Films prepared with dispersion in methanol with phosphoric acid were kept under vacuum at 120° C. overnight. Heat treated films cross-linked has shown higher resistance to corrosion.

TABLE 4

Effect of different anions used for PABA isolation:

| Anions | Results |
| --- | --- |
| Formic acid | PABA isolated with these anions was |
| Acetic acid | not well dispersed so electrophoretic |
| Phosphoric acid | deposition was not possible |
| p-Toluenesulfonic acid | PABA isolated with these anions was |
| Sodium dodecyl sulfate | well dispersed; however, |
| Sodium dodecyl benzene sulfonate | electrophoretic deposition was not possible. Electrophoretic deposition may be possible after optimizing parameters like anion concentration, dispersion solvent, and applied voltage. |

The effectiveness of boronic acid substituted polyaniline i.e., poly(anilineboronic acid) (PABA) generated by physical application from a methanol bulk solution on the protection of type 304 Stainless Steel from corrosion was observed. The corrosion protection properties of the PABA films on steel samples were investigated by pontentiodynamic polarization curves, open circuit potentials and microscopic measurements.

The present invention includes isomers such as geometrical isomers, optical isomers based on asymmetric carbon, stereoisomers and tautomers and is not limited by the description of the formula illustrated for the sake of convenience.

Although the foregoing invention has been described in some detail by way of illustration and example, and with regard to one or more embodiments, for the purposes of clarity of understanding, it is readily apparent to those of ordinary skill in the art in light of the teachings of this invention that certain changes, variations and modifications may be made thereto without departing from the spirit or scope of the invention as described in the appended claims.

It must be noted that as used in the specification and the appended claims, the singular forms of "a", "an" and "the" include plural reference unless the context clearly indicates otherwise.

Unless defined otherwise all technical and scientific terms used herein have the same meaning as commonly understood to one of ordinary skill in the art to which this invention belongs.

All publications, patents and patent applications cited in this specification are incorporated herein by reference as if each individual publication, patent or patent application were specifically and individually indicated to be incorporated by reference. The citation of any publication, patent or patent application in this specification is not an admission that the publication, patent or patent application is prior art.

REFERENCES

1. Shirakawa, H. *Angew. Chem., Int. Ed.* 2001, 40, 2575.
2. Heeger, A. J. *Angew. Chem., Int. Ed.* 2001, 40, 2591.
3. MacDiarmid, A. G. *Angew. Chem., Int. Ed.* 2001, 40, 2581.
4. For example see references in: Freund, M. S.; Deore, B. A. *Self-doped conducting polymers*, John Wiley & Sons, Ltd: 2007.
5. Shimizu, S.; Saitoh, T.; Uzawa, M.; Yano, K.; Maruyama, T.; Watanabe, K. *Synth. Met.* 1997, 85, 1337.
6. Jang, J.; Ha, J.; Kim, K. *Thin Solid Films* 2008, 516, 3152.
7. Konagaya, S.; Abe, K.; Ishihara, H. *Plastics, Rubber and Composites* 2002, 31, 201.
8. Li, W.; Hooks, D. E.; Chiarelli, P.; Jiang, Y.; Xu, H.; Wang, H. *Langmuir* 2003, 19, 4639.
9. Li, C.; Mitamura, K.; Imae, T. *Macromolecules* 2003, 36, 9957.
10. Cao, T.; Wei, L.; Yang, S.; Zhang, M.; Huang, C.; Cao, W. *Langmuir* 2002, 18, 750.
11. Kitty, K. Y.; Wong, H. L.; Chan, W. K.; Kwong, C. Y.; Djuristic, A. B. *Chem. Mater.* 2004, 16, 365.
12. Angelopoulos, M.; Patel, N.; Shaw, J. M.; Labianca, N. C.; Rishton, S. A. *J of Vacuum Science & technology* 1993, 11, 2794.
13. Hong, S.; Zhu, J.; Mirkin, C. A. *Langmuir* 1999, 15, 7897.
14. Li, G.; Martinez, C.; Semancik, S. *J. Am. Chem. Soc.* 2005, 127, 4903.
15. Jang, J.; Ha, J.; Cho, J.; *Adv. Mater.* 2007, 19, 1772.
16. Crowley, K.; OMalley, E. Morrin, A.; Smyth, M. R.; Killard, A. J. *Analyst* 2008, 133, 391.
17. Gangopadhyay, R.; De, A. *Chem. Mater.* 2000, 12, 608.
18. Jang, J. *Adv. Polym. Sci.* 2006, 199, 189.
19. Wessling, B. *Synth. Met.* 2003, 135, 265.
20. Kahol, P. K.; Ho, J. C.; Chen, Y. Y.; Wang, C. R.; Neeleshwar, S.; Tsai, C. B. Wessling, B. *Synth. Met.* 2005, 151, 65.
21. Geng, Y. H.; Sun, Z. C. Li, J.; Jing, X. B.; Wang, X. H.; Wang, F. S. *Polymer* 1999, 40, 5723.
22. Luo, J.; Zhang, H.; Wang, X.; Li, J.; Wang, F. *Macromolecules* 2007, 40, 8132.
23. For a review, see: Springsteen, G.; Wang, B.; *Tetrahedron* 2002, 58, 5291; Springsteen, G.; Wang, B.; *Tetrahedron* 2004, 60, 11205.
24. Westmark, P. R.; Valencia, L. S.; Smith, B. D. *J. Chromatogr., A* 1994, 664, 123.
25. Cooper, C. R.; Spencer, N.; James, T. D. *Chem. Commun.* 1998, 1365.
26. Deore, B. A.; Yu, I.; Freund, M. S. *J. Am. Chem. Soc.* 2004, 126, 52.
27. Deore, B. A.; Yu, I.; Aguiar, P. M.; Recksiedler, C.; Kroeker, S.; Freund, M. S. *Chem. Mater.* 2005, 17, 3803.
28. Deore, B. A.; Yu, I.; Woodmass, J.; Freund, M. S. *Macromol. Chem. and Phys.* 2008, 209, 1094.
29. Sood, A.; Shaw, B. R.; Spielvogel, B. F. *J. Am. Chem. Soc.* 1990, 112, 9000.
30. Kameta, N.; Hiratani, K. *Chem. Lett.* 2006, 35, 536.
31. D. Briggs, J. T. Grant, *Surface Analysis by Auger and X-ray Photoelectron Spectroscopy*, IM Publication, Chichester, United Kingdom, p. 138, 2003.
32. D. R. Clarke, S. Suresh, and I. M. Ward, *Surface Analysis of Polymers by XPS and Static SIMS*, Cambridge University Press, p. 44, 1998.
33. Neoh, K. G.; Kang, E. T. Tan, K. L. *J. Phys. Chem.* 1991, 95, 10151.
34. Kang, E. T.; Neoh, K. G.; Tan, K. L. *Prog. Polym. Sci.* 1998, 23, 277.
35. Domaille, P. J.; Druliner, J. D.; Grosser, L. W.; Read Jr., J. M.; Schmelzer, E. R.; Stevens, W. R. *J. Org. Chem.* 1985, 50, 189.

36. Kim, D. H.; Marbois, B. N.; Faull, K. F.; Eckhert, C. D. *J. Mass Spectrom.* 2003, 38, 632.
37. Kim, D. H.; Faull, K. F.; Norris, A. J.; Eckhert, C. D. *J. Mass Spectrom.* 2004, 39, 743.
38. Epstein, A. J.; McCall, R. P.; Ginder, J. M.; MacDiarmid, A. G. *In Spectroscopy of Advanced Materials*; John Wiley & Sons: New York, 1991.
39. Socrates, G. *Infrared Characteristic Group Frequencies.* Tables and Charts, 2nd ed.; John Wiley & Sons: New York, 1994.
40. Colthup, N. B.; Daly, L. H.; Wiberley, S. E. *Introduction to Infrared and Raman Spectroscopy*, Academic Press, 1975.
41. Chen, X.; Liang, G.; Whitmire, D.; Bowen, J. P. *J. Phys. Org. Chem.* 1998, 11, 378.
42. Recksiedler, C.; Deore, B. A.; Freund, M. S. *Langmuir,* 2005, 21, 3670.
43. Stafstrom, S.; Breda, J. L.; Epstein, A. J.; Woo, H. S.; Tanner, D. B.; Huang, W. S.; MacDiarmid, A. G. *Phys. Rev. Lett.* 1987, 59, 1464.
44. Wudl, F.; Angus, R. O.; Lu, F. L.; Allemand, P. M.; Vachon, D. J.; Nowak, M.; Liu, Z. X.; Heeger, A. J. *J. Am. Chem. Soc.* 1987, 109, 3677.
45. Huang, W. S.; Humphrey, B. D.; MacDiarmid, A. G. *J. Chem. Soc. Faraday Trans.* 1986, 82, 2385.
46. Nicolas, M.; Fabre, B.; Marchand, G.; Simonet, J. *Eur. J. Org. Chem.* 2000, 9, 1703.
47. Deore, B. A.; Freund, M. S. *Analyst* 2003, 128, 803.
48. Deore, B. A.; Hachey, S.; Freund, M. S. *Chem. Mater.* 2004, 16, 1427.
49. Lukachova, L. V.; Shkerin, E. A.; Puganova, E. A.; Karyakina, E. E.; Kiseleva, S. G.; Orlove, A. V.; Karpacheva, G. P.; Karyakin, A. A. *J. Electroanal. Chem.* 2003, 544, 59.
50. Chidsey, C. E. D.; Murray, R. W. *J. Phys. Chem.* 1986, 90, 1479.
51. Zhang, C.; Yao, B.; Huang, J.; Zhou, X. *J. Electroanal. Chem.* 1997, 440, 35.
52. For example, see Tallman et al. *J. Solid State Electrochem.* 2002, 6:85-100.

What is claimed is:

1. A method for producing a polymer, which method comprises mixing, in any order: a monomer having a boronic acid moiety, or a salt thereof; a compound having a phosphate moiety; a compound having a fluoride moiety; and an oxidizing agent, in the presence of a solvent.

2. The method according to claim 1, wherein the monomer having a boronic acid moiety, or the salt thereof, is a monomer of a conducting polymer.

3. The method according to claim 1, wherein the monomer having a boronic acid moiety, or the salt thereof, is aniline, pyrrole or thiophene having a boronic acid moiety, or a salt thereof.

4. The method according to claim 1, wherein the compound having a phosphate moiety is phosphoric acid.

5. The method according to claim 1, wherein the compound having a fluoride moiety is sodium fluoride.

6. The method according to claim 1, wherein the oxidizing agent is selected from the group consisting of ammonium persulfate, ferric chloride, potassium iodide, potassium dichromate and potassium permanganate.

7. The method according to claim 1, wherein the solvent is water.

8. A polymer produced by the method as defined in claim 1, wherein the polymer is in the form of a nanoparticle.

9. The polymer according to claim 8, wherein the nanoparticle has a particle size in the range of from about 25 to about 50 nm.

10. A dispersion comprising the polymer as defined in claim 8 and a solvent.

11. The dispersion according to claim 10, wherein the solvent comprises aqueous phosphoric acid.

12. A method of preparing an anti-corrosive polymer comprising: mixing, in any order, a monomer having a boronic acid moiety, or a salt thereof, a compound having a fluoride moiety and an oxidizing agent in the presence of phosphoric acid.

* * * * *